United States Patent
Weinreb et al.

(10) Patent No.: US 10,891,421 B2
(45) Date of Patent: Jan. 12, 2021

(54) APPARATUSES, METHODS AND SYSTEMS FOR ADJUSTING TAGGING IN A COMPUTING ENVIRONMENT

(71) Applicant: Refinitiv US Organization LLC, New York, NY (US)

(72) Inventors: Enav Weinreb, Tel-Aviv (IL); Rani Shlivinski, Tel-Aviv (IL); Shai Hertz, Tel-Aviv (IL); Shai Taub, Tel-Aviv (IL); Yaniv Ben-Meir, Tel-Aviv (IL); Chen Weiss, Tel-Aviv (IL); Dmitry Levinson, Tel-Aviv (IL); Danel Kotev, Tel-Aviv (IL); Lior Gelernter, Tel-Aviv (IL); Saar Miron, Tel-Aviv (IL)

(73) Assignee: Refinitiv US Organization LLC, New York, NY (US)

(*) Notice: Subject to any disclaimer, the term of this patent is extended or adjusted under 35 U.S.C. 154(b) by 251 days.

(21) Appl. No.: 15/844,834

(22) Filed: Dec. 18, 2017

(65) Prior Publication Data
US 2019/0188247 A1    Jun. 20, 2019
US 2019/0361960 A9    Nov. 28, 2019

Related U.S. Application Data

(63) Continuation-in-part of application No. 15/478,772, filed on Apr. 4, 2017.
(Continued)

(51) Int. Cl.
*G06F 16/68* (2019.01)
*G06F 40/117* (2020.01)
(Continued)

(52) U.S. Cl.
CPC ............ *G06F 40/117* (2020.01); *G06F 16/14* (2019.01); *G06F 16/164* (2019.01); *G06F 16/38* (2019.01); *G06F 16/93* (2019.01)

(58) Field of Classification Search
CPC .................. G06F 17/30; G06F 16/68
(Continued)

(56) References Cited

U.S. PATENT DOCUMENTS

| | | | |
|---|---|---|---|
| 8,799,268 B2 * | 8/2014 | Branca | G06F 40/232 707/713 |
| 9,117,447 B2 | 8/2015 | Gruber et al. | |

(Continued)

FOREIGN PATENT DOCUMENTS

WO    2017/176749 A1    10/2017

OTHER PUBLICATIONS

Thomson Reuters. "Thomson Reuters Intelligent Tagging—Powered by Calais." https:/financial.thomsonreuters.com/tagit, 2 pages (2015).
(Continued)

*Primary Examiner* — Baoquoc N To
(74) *Attorney, Agent, or Firm* — Winthrop & Weinstine, P.A.

(57) ABSTRACT

The present disclosure is directed to methods, systems and programs for adjusting tagging of files. An illustrative method includes receiving a request to upload at least one document from a user via processor, assigning a first metadata tag via processor to at least one word contained within the at least one document, wherein the first metadata tag identifies the at least one word as an alias for a first unique entity, delivering the at least one document to the user including the first metadata tag via processor, receiving feedback via processor from the user relating to the assignment of the first metadata tag to the at least one word, determining at least one potential adjustment for the assignment of the first metadata tag via processor, sending information to the user proposing the at least one potential
(Continued)

adjustment via processor, and receiving confirmation information from the user concerning the potential adjustment.

21 Claims, 17 Drawing Sheets

Related U.S. Application Data

(60) Provisional application No. 62/376,039, filed on Aug. 17, 2016, provisional application No. 62/318,412, filed on Apr. 5, 2016.

(51) Int. Cl.
    *G06F 16/14*     (2019.01)
    *G06F 16/93*     (2019.01)
    *G06F 16/16*     (2019.01)
    *G06F 16/38*     (2019.01)

(58) Field of Classification Search
    USPC .................................................. 707/705, 706
    See application file for complete search history.

(56) References Cited

U.S. PATENT DOCUMENTS

| | | | |
|---|---|---|---|
| 9,135,252 B2 | 9/2015 | Scholtes et al. | |
| 9,298,981 B1 | 3/2016 | Ragnet et al. | |
| 2003/0051197 A1* | 3/2003 | Evans | G11C 29/12 714/718 |
| 2007/0282663 A1 | 12/2007 | Barlament | |
| 2008/0240490 A1* | 10/2008 | Finkelstein | H04N 21/235 382/100 |
| 2011/0119059 A1 | 5/2011 | Ljolje et al. | |
| 2013/0318054 A1 | 11/2013 | Scholtes et al. | |
| 2014/0324808 A1* | 10/2014 | Sandhu | G06F 16/34 707/706 |
| 2016/0070801 A1* | 3/2016 | Patil | G06F 16/9535 707/727 |
| 2016/0078022 A1 | 3/2016 | Lisuk et al. | |
| 2016/0357731 A1* | 12/2016 | Zorzin | G06F 40/30 |
| 2017/0185583 A1* | 6/2017 | Pino | G06F 40/289 |
| 2019/0188247 A1 | 6/2019 | Weinreb et al. | |

OTHER PUBLICATIONS

Thomson Reuters. "Making Data Intelligent." 1 page (2015).
International Preliminary Report on Patentability and Written Opinion, dated Oct. 18, 2010 for corresponding International Patent Application PCT/US2017/025937, 8 pgs.
Examination Report No. 1, dated Mar. 14, 2019, for corresponding Australian Patent Application No. 2017246552, 3 pgs.
Response to Examination Report No. 1, filed on May 7, 2019, for corresponding Australian Patent Application No. 2017246552, 84 pgs.
Examination Report No. 2, dated May 29, 2019, for corresponding Australian Patent Application No. 2017246552, 4 pgs.
Response to Examination Report No. 2, filed on Jul. 24, 2019, for corresponding Australian Patent Application No. 2017246552, 84 pgs.
Brank et al., "Interaction of Feature Selection Methods of Linear Classification Models," Workshop on Text Learning, in Conjuction with Int'l Conf on Machine Learning (ICML), pp. 1-6 (Jul. 2002).
Broder, "Identifying and Filtering Near-Duplicate Documents," Combinatorial Pattern Matching: 11th Annual Symposium, CPM 2000, LNCS 1848, pp. 1-10, Montreal, CA, Jun. 21-23, 2000 Proceedings (Jun. 2000).
Fan et al., "Liblinear: a library for large linear classification," J. Machine Learning Research 9(9):1871-1874, (Aug. 2008).
Joachims, "Text Categorization with Support Vector Machines: Learning with Many Relevant Features," Univ. of Dortmund Computer Science Department, LS-8 Report 23, (Dortmund Nov. 27, 1997) (Rev. Apr. 19, 1998).
Monteleoni, "Learning with Online Constraints: Shifting Concepts and Active Learning," Computer Sci and Artificial Intelligence Laboratory Technical Report, MIT-CSAIL-TR-2006-057, (Sep. 1, 2006).
Olsson, "A Literature Survey of Active Machine Learning in the Context of Natural Language Processing," SICS Technical Report T2009:06, ISSN: 1100-3154, Swedish Inst. of Comptuer Sci (Apr. 17, 2009).
Sebastiani, "Machine Learning in Automated Text Categorization," Intituto di Elaborazione dell'Informazione, ACM Computing Surveys (CSUR), 34(1):1-47, (Mar. 2002).
Settles, "Active Learning Literature Survey," Computer Sciences Technical Report 1648, Univ of Wisconsin-Madison, (updated on Jan. 26, 2010).
Tong, "Active Learning: Theory and Applications," Dissertation, Department of Computer Science and the Committee on Graduate Studies of Stanford Univ., (Aug. 2001).
Zadrozny et al., "Tranforming Classifier Scores into Accurate Multiclass Probability Estimates," Proceedings of the 8th ACM SIGKDD Int'l Conference on Knowledge Discovery and Data Mining, pp. 694-699, Dept of Computer Sci and Eng, Univ of California-San Diego (KDD 2002).
Foreign Written Opinion dated Feb. 13, 2020, for corresponding Singapore patent application No. 11201805746Y.
Notice of Acceptance received for Australian Patent Application No. 2017246552, dated Aug. 7, 2019, 3 pages.
Thomson Reuters, "Thomson Reuters Intelligent Tagging—Powered by Calais," 2015, 2 pages, retrieved from https:/financial.thomsonreuters.com/agit.
Thomson Reuters, "Making Data Intelligent," 2015, 1 page.
First Examination Report dated May 22, 2020 in Australian Patent Application 2019236757 (6 pages).
Response to first Examination Report filed on Jun. 12, 2020 in Australian Patent Application 2019236757 (85 pages).
Second Examination Report dated Jul. 7, 2020 in Australian Patent Application 2019236757 (4 pages).
Response to second Examination Report filed on Aug. 6, 2020 in Australian Patent Application 2019236757 (86 pages).
Third Examination Report dated Sep. 2, 2020 in Australian Patent Application 2019236757 (5 pages).
International Search Report and Written Opinion for corresponding International Patent Application PCT/US2017/025937, dated Jun. 21, 2017 (9 pages).
Chen et al., "Semi-supervised Multi-label Learning by Solving a Sylvester Equation," Published in SDM 2008, pp. 410-419.
Erkan et al., "Improved Nearest Neighbor Methods for Text Classification," (2011).
Li, "Positive Unlabelled Learning for Document Classification," Encyclopedia of Data Warehousing and Mining, Second Edition, pp. 1552-1557, (2009).
Li, "A Survey on Positive and Unlabeled Learning," Computer & Information Sciences University of Delaware, pp. 5, 2013.
Non-Final Office Action dated Jun. 19, 2020 in U.S. Appl. No. 15/478,772.
Final Office Action dated Nov. 2, 2020 in U.S. Appl. No. 15/478,772.

\* cited by examiner

FIGURE 2C

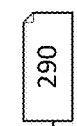
FIGURE 2M
FIGURE 2N
FIGURE 2O
FIGURE 2P

APPARATUSES, METHODS AND SYSTEMS FOR ADJUSTING TAGGING IN A COMPUTING ENVIRONMENT

This application for letters patent discloses and describes various novel innovations and inventive aspects of graph database analysis technology (hereinafter "disclosure") and contains material that is subject to copyright, mask work, or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for adjusting tagging in a computing environment. As such, the present innovations include (at least) the following distinct area, including:

a data processing tool (with a suggested Class/Subclass of 706/16, 17 and 18).

However, in order to develop a reader's understanding of the innovations, descriptions have been compiled into a single disclosure to illustrate and clarify how aspects of these innovations operate independently, interoperate as between individual innovations, or cooperate collectively. The application goes on to further describe the interrelations and synergies as between the various innovations; all of which is to further comply with 35 U.S.C. § 112.

BACKGROUND

In data mining in documents, vast numbers of documents can be searched for key words or terms, and tagged accordingly, in an effort to identify relevant information. However, these systems can benefit from improvement. The presently disclosed embodiments provide improvements to these kinds of systems.

SUMMARY

Advantages of the present disclosure will be set forth in and become apparent from the description that follows. Additional advantages of the disclosure will be realized and attained by the methods and systems particularly pointed out in the written description and claims hereof, as well as from the appended drawings.

The present disclosure is directed to a simple, user-centric means to correct errors in tagging engines. Commercial entity extraction services (e.g. Alchemy, Google's NLP API) are offered 'as is', without an external ability to fix specific mistakes. Other engines (e.g. StanfordNLP) allow the user to re-train the models altogether, which requires a significant effort (collecting training data and tagging it, analyzing errors etc.) and doesn't guarantee fixing a specific problem but rather training a whole new model for a specific domain. References to the term "NLP" herein are intended to refer to Natural Language Processing ("NLP").

Where a tagging engine is based on a statistical model, it tends to make mistakes, some of them being recurring, such as systematically missing a company's alias in text documents, and/or resolving an alias for a company to another company. The present disclosure provides methods, systems and machine readable programs to fix these kinds of problems quickly, to make the system more tuned to their needs.

Thus, in accordance with some implementations, the disclosure provides methods for adjusting results generated by an automated tagging engine. An illustrative method includes receiving a request to upload at least one document from a user via processor, assigning a first metadata tag via processor to at least one word contained within the at least one document, wherein the first metadata tag identifies the at least one word as an alias for a first unique entity, delivering the at least one document to the user including the first metadata tag via processor, receiving feedback via processor from the user relating to the assignment of the first metadata tag to the at least one word, determining at least one potential adjustment for the assignment of the first metadata tag via processor, sending information to the user proposing the at least one potential adjustment via processor, and receiving confirmation information from the user concerning the potential adjustment via processor.

In some implementations, the method can further include implementing the at least one potential adjustment by assigning a different metadata tag to the at least one word in the at least one document via processor. In some implementations, the assigning step can precede the first receiving step. If desired, the first receiving step can precede the assigning step. In some implementations, the at least one document includes a plurality of documents. In some implementations, the at least one word can include a plurality of words. For example, the at least one word can include a phrase.

In some implementations, the phrase can be one of a plurality of aliases for the entity associated with the unique identifier. In some embodiments, sending information to the user that proposes the at least one potential adjustment via processor can actually include providing a plurality of potential adjustments to the user, wherein the user can select which adjustment(s) to make. For example, such as where a tag is assigned in error, the at least one potential adjustment can include not assigning a tag to the at least one word. In another example, the at least one potential adjustment can include assigning a tag to the at least one word (or phrase, or alias) that associates the at least one word with a second unique entity.

In some implementations, the first unique entity can be associated with a first unique identifier, such as a unique alphanumeric ID. Similarly, the second unique entity can be associated with a second unique identifier.

In some implementations, the at least one document can include a data set including a plurality of documents, wherein the data set is generated by the user performing a keyword search of a database for documents including at least one of a plurality of aliases associated with the first unique entity based on a keyword list, the plurality of aliases including words (i) that are, and, (ii) that are not associated with the first unique entity. In some embodiments, performing the keyword search can include receiving a list of keywords from the user to be searched. If desired, determining the at least one potential adjustment for the assignment of the first metadata tag can include generating a term list including a phrase that is one of the plurality of aliases for the first unique entity. Moreover, determining the at least one potential adjustment for the assignment of the first metadata tag can include generating a term list including a phrase that is not one of the plurality of aliases for the first unique entity.

In some implementations, determining the at least one potential adjustment for the assignment of the first metadata tag can include generating a term list relating to the first unique entity, and further wherein tagging at least one word of a further document includes (i) determining if the further document includes the at least one word, and (ii) determining if the further document also includes a term from the term list, and tagging the at least one word in the further document if a term from the term list is present in the further document. If desired, determining the at least one potential adjustment for the assignment of the first metadata tag can include generating a term list relating to the first unique entity, and tagging at least one word of a further document can include (i) determining if the further document includes the at least one word, and (ii) determining if the further document also includes a term from the term list, and not tagging the at least one word in the further document if a term from the term list is present in the further document.

The disclosure further provides apparatuses for carrying out the disclosed methods set forth herein. In one implementation, an apparatus is provided including a plurality of circuit modules, computer memory, and at least one processor configured and arranged to adjust results generated by an automated tagging engine. The apparatus further includes a first circuit module configured and arranged to receive a request to upload at least one document from a user, a second circuit module configured and arranged to assign a first metadata tag to at least one word contained within the at least one document, wherein the first metadata tag identifies the at least one word as an alias for a first unique entity. The apparatus further includes a third circuit module configured and arranged to deliver the at least one document to the user including the first metadata tag, a fourth circuit module configured and arranged to receive feedback from the user relating to the assignment of the first metadata tag to the at least one word, and a fifth circuit module configured and arranged to determine at least one potential adjustment for the assignment of the first metadata tag. The apparatus still further includes a sixth circuit module configured and arranged to send information to the user proposing the at least one potential adjustment, and a seventh circuit module configured and arranged to receive confirmation information from the user concerning the potential adjustment.

The disclosure further provides embodiments of a non-transitory computer readable medium storing a computer program for operating a system for adjusting results generated by an automated tagging engine. An illustrative program includes instructions for receiving a request to upload at least one document from a user, instructions for assigning a first metadata tag to at least one word contained within the at least one document, wherein the first metadata tag identifies the at least one word as an alias for a first unique entity, instructions for delivering the at least one document to the user including the first metadata tag, instructions for receiving feedback from the user relating to the assignment of the first metadata tag to the at least one word, instructions for determining at least one potential adjustment for the assignment of the first metadata tag, instructions for sending information to the user proposing the at least one potential adjustment, and instructions for receiving confirmation information from the user concerning the potential adjustment.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure.

DETAILED DESCRIPTION

Reference will now be made in detail to the present preferred embodiments of the disclosure, examples of which are illustrated in the accompanying drawings. The methods and corresponding steps of the disclosed embodiments will be described in conjunction with the detailed description of the system.

As set forth above, the disclosed embodiments provide improvements in tagging of documents in order to produce more meaningful and complete search results. The presently disclosed embodiments can fix these kinds of problems quickly, to make the system more tuned to the needs of a user.

As an example of a tagging engine, the Thomson Reuters Intelligent Tagging ("TRIT™") engine analyzes the semantic content of a user's input files using a combination of statistical, machine-learning, and custom pattern-based methods and assigns accurate and detailed metadata tags to the input documents. The TRIT™ engine also maps the metadata-tags to Thomson Reuters unique IDs for entities such as companies. This supports disambiguation (and linking) of data across all documents processed by the TRIT™ engine, and also offers a user the opportunity to further enrich their data with related information from the datasets. However, because of the statistical nature of metadata tagging, output cannot always be expected to function perfectly. The present disclosure provides a set of user tools for optimizing, extending, and customizing the functionality of the underlying natural language processing ("NLP") engine for a user's particular use case.

Figure 1:
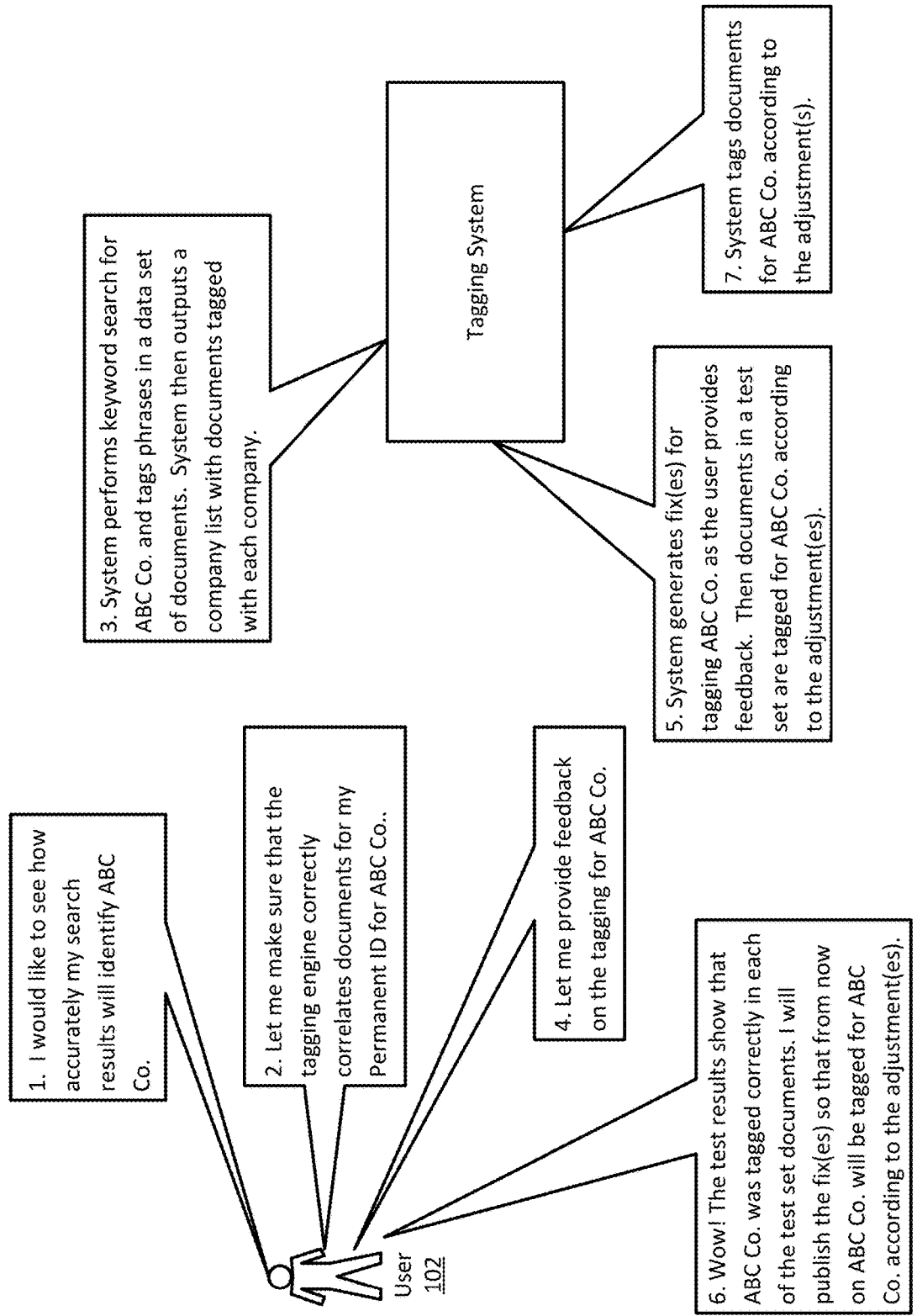
FIG. 1 shows an exemplary usage scenario in one embodiment of a system in accordance with the disclosure.

For purposes of illustration, and not limitation, FIG. 1 shows an exemplary usage scenario in one embodiment of the disclosure. In FIG. 1, a user 102 may utilize an embodiment of the disclosed system to tune the performance of a tagging engine. For example, in use, the TRIT™ engine identifies and tags mentions of companies (e.g., ABC Co.) in the text. These mentions, or phrases, which are identified as referring to a company, are referred to as "aliases" in the present disclosure. A user can then create an "entity tuning" project to evaluate the performance of the TRIT™ engine, and, if needed, can fix tagging issues for a particular company of interest to the user.

In accordance with one illustrative example, a user can create a project to improve precision/recall and/or to correct company tagging errors/omissions for a specific company. Thus, a user can create a project for a company with potential tagging issues (e.g., inaccurate tags) that the user would like to evaluate, and if desired, adjust. The user first prepares a dataset to be analyzed (e.g., a large group, such as thousands, of documents). The user can then set up their tagging evaluation project within the disclosed entity tuning module by uploading the data set of documents, and run the tagging engine, such as the TRIT™ engine or another engine. The TRIT™ engine then tags the documents in accordance, for example, with user-specified criteria, such as a keyword list. The user can then build a test set and run an initial test to obtain baseline precision and recall values. If the precision and recall measures are acceptable, the user need not adjust the tagging. However, if the results are not acceptable, the user can adjust, or "tune" the tagging. This can in turn be done by identifying the company aliases which were not properly tagged. Ideally, the user should provide feedback to the system on all of the tags assigned to these aliases. This feedback, in turn, is used to generate the tagging fixes. The system can then go through another test cycle to measure the quality of tagging with the adjustments/fixes. If precision and recall measures are acceptable, the user may then choose to publish the company tagging fixes. Otherwise, the user can continue to tune the tagging criteria until the results are acceptable.

With respect to preparing the data set, a user gathers and prepares a group, or corpus, of documents believed to be relevant to the company the user wishes to tune. The corpus of documents thus represents the data set the user uploads, tags, and then tunes in order to create the company fixes. Data sets of at least 100-150 documents per company alias are believed to be optimal, in some embodiments, for obtaining best results. The test set is typically a subset (e.g., 30%) of the overall corpus that is used to test fixes in the tuning process.

The user may prepare a keywords list. This list is preferably a comprehensive list of relevant company aliases, including problematic ones. The user then implements the corpus builder to gather documents containing the keywords and pack them in a format suitable for upload for tuning.

Thus, the user may create a list of words, including phrases, as appropriate, that are relevant to the company (or other entity) that the user is investigating. This can typically be done with reference to several documents confirmed to be relevant to the company/entity to identify what the user deems to be appropriate keywords. These keywords can then be used to retrieve data and test set documents with the corpus builder module.

In various implementations, the keyword list can include, for example, individual words, or groups of words such as phrases (referred to herein as "company aliases") that the user believes refers to the company. Partial phrases should also be included, for example, "Kirby" in addition to "Kirby Corporation," and "Apple" in addition to "Apple, Inc." A user can also list ambiguous phrases that might be references to the name of the company, phrases that are incorrectly identified and tagged as company mentions, subsidiaries or parent companies that are incorrectly identified, and the like. For example, Kirby Corporation, might commonly be referred to in news stories as Kirby Corporation, Kirby Corp, Kirby Corp., Kirby, or even by its ticker symbol, KEX. But although the phrase Kirby may be a mention of the company Kirby Corporation in one context, in another context the same phrase might refer to a person named Kirby, or the Nintendo® character Kirby®. Moreover, it is helpful to include company aliases that a user knows of that are not currently identified by the (e.g., TRIT™) tagging engine. It is also helpful to include in the keyword list phrases that a user knows to be incorrectly identified and tagged as the company.

A user can thus use the corpus builder module to gather a set of documents that contain specified phrase(s) (company aliases). In some embodiments, the corpus builder module sends a keyword search to a large, dynamic index of news stories from multiple sources, retrieves files according to the search criteria, and can pack them into a compressed file format (e.g., ZIP file) ready for upload on the user interfaces for the user-directed entity tuning module (for generating the data set), or the GUI for generating the test set, for example. If desired, the search query can specify one or more company aliases. If desired, the corpus builder module can support generating both the data set and the test set at the same time.

If a user wishes to build a corpus from one or more specified sources, the user can use a corpus builder application programming interface ("API"). Additionally or alternatively, the disclosed system can provide a custom corpus builder graphical user interface to define and launch the query. Accordingly, in this example, the user can launch the corpus builder, and create a corpus using any suitable document source. The user can then be provided with a GUI for entering one or more company aliases in separate fields, or separated by commas in a single field, for example. Each company alias can be comprised of single or multiple words, and may include spaces, periods, and other special characters with the exception of the comma (,) if the comma is used to separate aliases in the input field. Other criteria such as date range(s) for the documents to be returned can similarly be provided. A further field can be provided wherein a user can select the percentage of the files in the data set used for testing, such as between 5 and 50% in increments of one percent. Moreover, the interface can permit the user to build only a data set or only a test set, for example, by specifying a ratio in the GUI of 100:0 or 0:100. The interface can also specify the number of documents to be provided in the corpus overall (in an effort to limit the size of the corpus), and/or the number of documents per alias can be limited to a maximum number (e.g., 5-200 in any desired increment). Once all of the data fields are completed, the user can initiate the program to create the corpus. The corpus builder can then build the data set and/or test set and assemble each into a suitably named compressed file or otherwise place the documents in each set into a separate folder.

Once the data set and/or test sets are assembled, the resulting files need to be uploaded for tagging and tagging evaluation. In the process of uploading, the system can be configured to index the documents, remove zones of repetitive text, remove files in an incorrect format (e.g., not in .XML format), and the like. For example, the system can assign a class to each alias. For example, if the initial database from which the documents are obtained is a business news database, a class can be assigned to certain documents that probably relate to particular companies. Similarly, a further class can be assigned to certain documents that do not appear to relate to particular companies. A further class can be specified, for example, to documents that do (or do not) relate to particular companies, wherein the initial document database was not a business-oriented or other "specialized" database. Moreover, in the course of processing documents being uploaded, the system can clean the documents of repetitive patterns, such as those related to the structure of the document, rather than its content. The system can also cluster documents into groups that appear to have similar context. If desired, further documents can be uploaded into the data set and/or test set after the initial document upload.

In further accordance with the disclosure, following the first upload of files, the system can be configured to display a list of files in a document upload window or screen. The files can be placed in any order, such as the order in which they are downloaded, or in accordance with size, perceived creation date, and/or in accordance with a class or cluster to which the document is assigned. The document upload window or screen can include a filename, which can include the entire path of the filename as defined in the compressed file. Long filenames can be truncated for display purposes. A user can hover a cursor over the filename to view the entire name. A title or snippet field can be included in the window, displaying, for example, a title of the document, if a title field was defined in the document file (e.g., XML file). Alternatively, the first line of the body of the document, or a portion thereof, can be displayed. The source type of the document can be included, whether a date field (of any kind) was present in the source file, and the like.

A search function can be provided within the document upload window to facilitate a search of the files in order to cull and display a subset of the uploaded files. For example, a search window can be provided for receiving input search terms one or more search terms. The searching function can be configured to return any files in the uploaded documents in which any of the words entered in the search field are found in the title or body of each respective document. To search for a specific phrase, a user can use quotation marks to specify the term. Similarly, wildcard characters (e.g., "*") can be used. A subset of the files containing the terms are returned and displayed in the document screen. Clearing out the search and re-executing the search with no entry in the search window will return the original set of results. The document upload window can also provide a document preview capability, wherein a user can preview the file in a document preview pane by clicking on the filename of the document in the document list.

The system GUI can also provide an actuator to run tagging on the uploaded documents, and to generate (or update) a list of companies to search for. Tagging can be performed, for example, by the TRIT™ engine or other suitable tagging engine. In accordance with one implementation, the first time a user engages the actuator to run a tagging operation, all of the uploaded documents are tagged and a company list is generated. Running the tagging operation will tags any additional documents that are uploaded, and add them to the company list.

In some implementations, during the tagging operation, the system identifies and tags mentions of companies in the documents and maps them to a unique identifier, such as the PermID, of matching companies within the system. The system can be configured to identify different words or phrases as mentions of the same company, referred to herein as company "aliases". For example, Thomson Reuters, and Reuters are two aliases that may refer to Thomson Reuters Corporation. The linking of a word or phrase to a unique ID (e.g., the Thomson Reuters PermID) is an exact and specific identity recognition. The mapping permits all of the aliases to be unambiguously identified (and thus linked) across all documents processed by the (e.g., TRIT™) tagging engine. Additionally, the mapping permits the user to further enrich their data with information from the Thomson Reuters datasets, if so configured.

After the tagging operation is complete, a user can then browse the company list to view the results of company tagging, and then provide feedback about the individual company tags, referred to herein as "tuning" or adjusting the tagging.

After the tagging operation has completed, a tuning screen (GUI) can be provided that displays a list of the companies that were identified in the uploaded documents, tagged, and mapped to unique identifiers (e.g., the Thomson Reuters PermID). A PermID is the Thomson Reuters unique ID for a company. During tuning however, a user can be provided with an opportunity to verify the PermID to which a document has been mapped, or to map the document to a different PermID. In this implementation, a user can hover over and select a PermID hyperlink to open the relevant company page in PermID.org.

A user can further utilize the company list in order to examine how company tagging was applied to the documents by seeing which companies were identified. A user can similarly view the individual company tags that were assigned to the documents, by seeing which aliases were effectively identified as being associated with companies, and how these phrases were mapped to companies in the Thomson Reuters dataset. A user can also identify the company aliases that require tuning, and tune these aliases by providing feedback about the company tags, as well as adjust tagging errors and confirm accurate tags. This feedback then results in adjustments, or "fixes", that improve company tagging.

Figure 2A:
FIGS. 2A-2R show illustrative usage scenarios of methods, systems and machine readable programs in accordance with the disclosure.

FIG. 2A illustrates an illustrative GUI presenting a company list 200. As illustrated, a number of statistics are displayed. For example, a Documents statistic field 202 can be displayed, listing, for example, the total number of documents in which the tagging mechanism found a mention of the company. In some implementations, a document in which more than one company alias is identified will appear in the document list for each alias, but only be counted once by the "Documents" field. By hovering over the Documents field, a user can select a Documents hyperlink to display all the documents in the alias lists.

A "Possible Recall Errors" field is also provided on company list 200 indicating the number of documents in which the company tag was not actually assigned but could have been, such as where an alias for a company was not identified as referring to a company even though it appears in a context that could refer to a company, or could be indicative enough by itself. A user can then provide feedback about possible recall errors during the tuning process. If a single document contains possible recall errors for more than one alias, the document is displayed in each of the relevant alias lists, and each appearance is counted in the "Possible Recall Errors" statistic field. A user can select a hyperlink associated with the Possible Recall Errors field in order to filter the alias lists.

A Possible Precision Errors statistic field 206 is further illustrated, indicating the number of documents in which this company tag assignment may be incorrect, such as where an alias of a company was identified as referring to the company even though it appears in a context that might contradict that a company tag should be assigned (e.g. refers to a person or a location, instead of a company). The user can also provide feedback about possible precision errors during tuning with respect to this statistic. If a single document contains possible precision errors for more than one alias, the document can be displayed in each of the relevant alias lists, and each appearance can be counted in the "Possible Precision Errors" statistic field 206. A user can select a hyperlink associated with the Possible Precision Errors field in order to filter the alias lists.

A High Confidence Tags statistic field 208 is also illustrated, indicating the number of documents in which the probability is high that the company tag is accurate according to various suitable criteria. A user can validate high confidence tags during the tuning process as well. If a single document contains high confidence tags for more than one alias, the document can be displayed in each of the relevant alias lists, and each appearance can be counted in the "High Confidence Tags" statistic. A user can select a hyperlink associated with the High Confidence Tags field in order to filter the alias lists.

A Low Confidence Tags statistic field 210 is also illustrated, indicating the number of documents in which the company tag was not assigned, and further wherein the system is programmed that it should not be assigned, even though the phrase (the company alias) appears in the document according to various suitable criteria. If a single document contains low confidence tags for more than one alias, the document can be displayed in each of the relevant alias lists, and each appearance can be counted in the "Low Confidence Tags" statistic. A user can select a hyperlink associated with the Low Confidence Tags field in order to filter the alias lists.

Figure 2B:
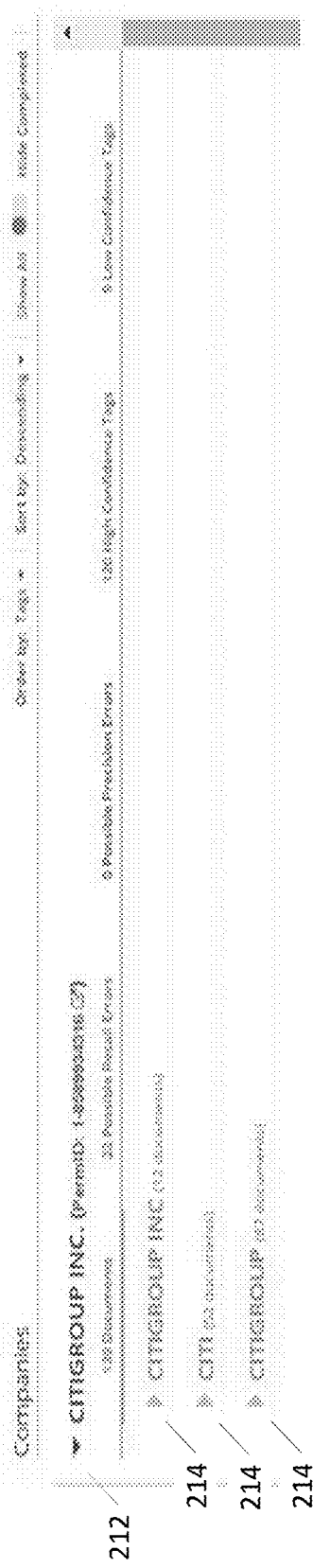

A user can hover over and select a hyperlink of a company name 212 (e.g. CITIGROUP, INC.) to display all of the distinct phrases (aliases) found in the text that the tagging mechanism identifies as a mention of the company. In the example of FIG. 2B, the tagging mechanism recognizes the following phrases (company aliases 214) that refer to the company Citigroup, Inc: Citigroup Inc, Citi, Citigroup.

Figure 2C:
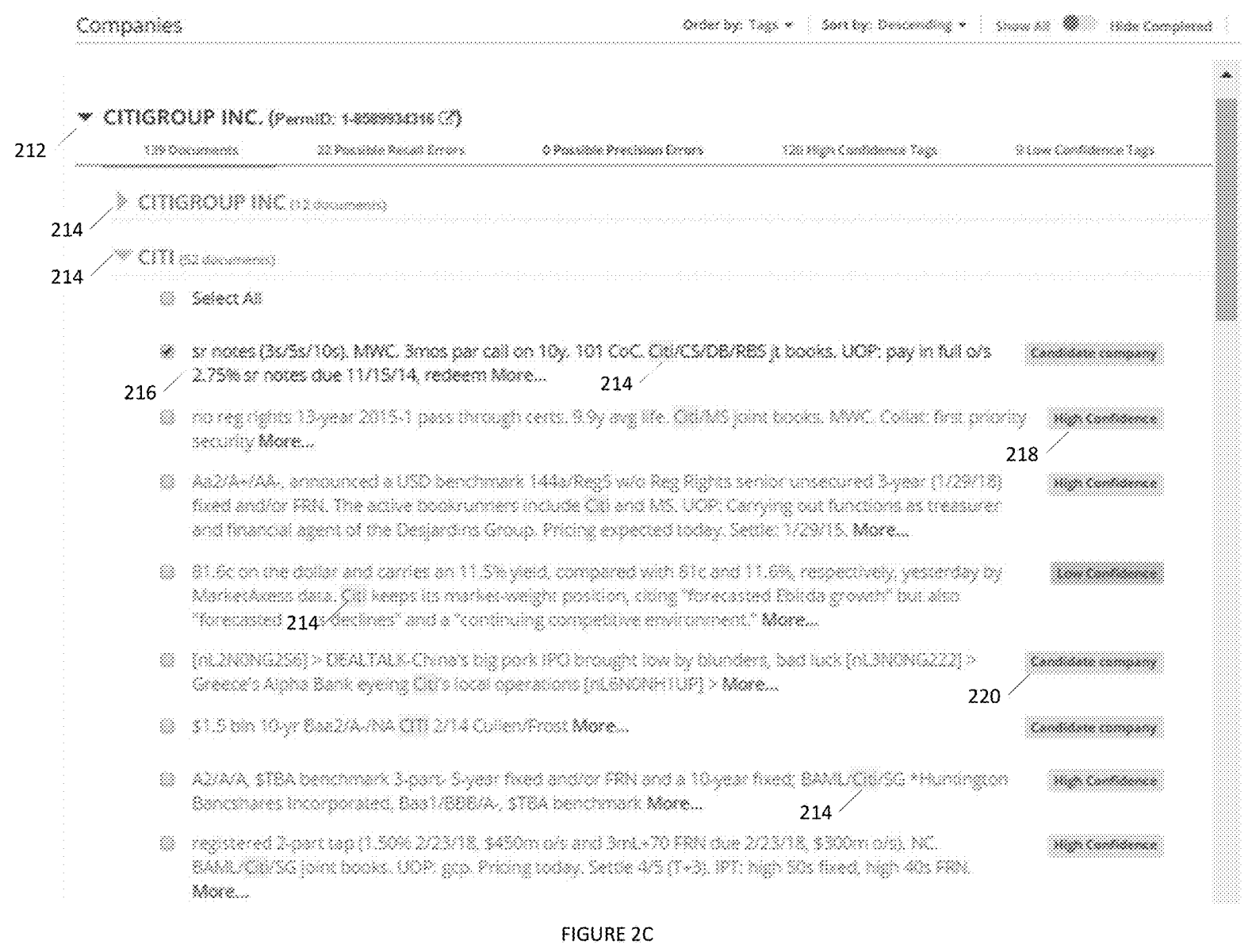
Figure 2D:
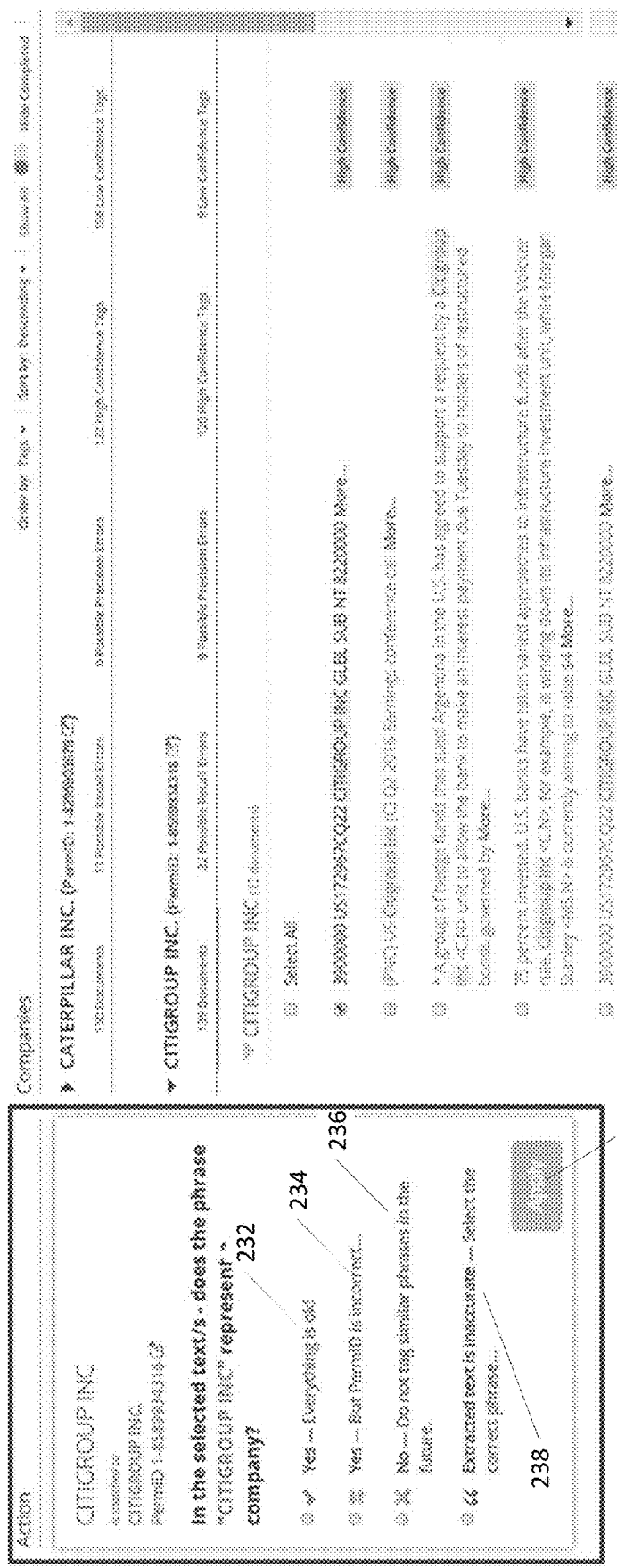

A user can then hover over and select a hyperlink of a company alias 214 (e.g. CITI) to view a list of snippets 216, one from each document in which the alias was found and tagged. The phrase identified as a company (the company alias) is highlighted as illustrated in FIG. 2C. A label is assigned to each snippet. In the illustrated example, a High Confidence tag 218 was applied to this phrase indicating a high level of confidence that it is indeed a company and that it was accurately mapped to the matching company in the Thomson Reuters data set. A Questionable Company tag (not specifically illustrated in FIG. 2C) indicates a possible precision error. For example, the highlighted phrase can be identified and tagged as a company, but it might not refer to this particular company. A Candidate Company tag 220 indicates a possible recall error. The highlighted phrase was not tagged, but it might refer to the company. Further, a Low Confidence tag (not specifically illustrated in FIG. 2C) can be provided indicating that the highlighted phrase was not tagged, and the system indicates that it is not likely a mention of the company. A user can use the tools provided in the Action pane 230 on the left illustrated in FIG. 2D (discussed in further detail below) to confirm or correct the default extraction.

In order to tune (adjust) the tagging mechanism, a user provides feedback about the company tags that were assigned by the initial tagging operation. Different phrases, or company "aliases" 214, in the documents may be identified as mentions of the same company. For example, Thomson Reuters, Thomson Reuters Corporation, and Reuters are all aliases that may refer to Thomson Reuters Corporation. A user can thus browse the company list 200 as set forth above to evaluate the effectiveness of the initial tagging operation. A user can review the companies that were extracted from the data set, and the company resolution (e.g., the PermID), the company aliases 214, the high and low confidence tags, and possible precision and recall errors, as set forth above.

It will be noted that, in certain embodiments, the company list 200 may be quite long, as it displays all the companies identified by the system in all of the uploaded documents. This list can be culled down by using a Search field when provided, to filter the displayed list of companies. For each alias 214, the user can then go through the list of tags, confirming the accurate tags and correcting the inaccurate tags. As the user provides feedback, company tagging fixes are automatically generated. In some implementations, if a user is tuning a particular alias, the user must provide feedback on all of the documents in the alias list.

A user should be careful to pay attention to the aliases 214. For example, if one of the aliases a user identified in advance is missing, a user should make sure it appears in the tuning set. If it does, then when running a tagging operation, the alias could have been mapped to the wrong company in the dataset. In this case, the alias 214 might appear in the company list 200 under the wrong company. This can occur for companies with similar names, for example subsidiaries and parent companies.

After the user has corrected several similar tagging errors, a company tagging fix can be automatically generated by the system. Additional feedback can result in further improvement of the adjustment, or change the type of the adjustment. In some implementations, two distinct fixes can be generated for an alias. If tuning feedback has been provided for all of the documents (snippets 116) in an alias list and an adjustment to tagging is not generated, the user can upload additional documents that contain the alias 214, thereby permitting the user to once again run tagging, and continue providing feedback for the files in the updated alias list. The Action pane 230 (on the left) can be used to confirm or correct the company tags displayed in the company list 200.

To provide feedback about company tags, a user should navigate to the company they want to tune in the company list 200, select the "Documents" hyperlink 202 to make sure that all documents are displayed in the alias lists (to make sure that no filters are applied). The user may then expand a company alias (e.g., 214) to view the documents in which the alias 214 (word or words) was identified as a company mention. The user may then select one of the documents (snippets 216) in the alias list by marking its associated checkbox.

Next, in the Action pane 230, the user can provide feedback about the company tag in the selected document. For example, the user can select Yes at field 232 if the highlighted phrase is a company and is mapped to the correct company in the Thomson Reuters dataset. The user can also select Yes at field 234, "but PermID is Incorrect" if the highlighted phrase is a company but is not mapped to the correct company in the Thomson Reuters dataset. When this option is selected, additional fields appear in the Action pane, permitting a user to map to the correct company. A user can select No at field 236 if the highlighted phrase does not refer to a company.

The user can alternatively select Extracted Text is Inaccurate at field 238 if the extracted text is incorrect. When a user selects this option, part of the document can be displayed at the bottom of the Action pane 230, with the phrase identified as a company mention highlighted. A user can use their pointing device to highlight the precise phrase. Next, in additional fields that appear in the Action pane 230 (not shown), a user can indicate the relevant PermID for the company. If provided, a user can select the "Do not tag the original phrase as a company in the future" checkbox to indicate that the original phrase is not a good alias for the company. Once the user is satisfied with the adjustments, at the bottom of the Action pane 230, the user can then select "Apply" at field 239. In some implementations, once a file has been processed, an icon can appears to the left of the filename in the company list 200 once it has been processed. If desired, the system can be configured such that by a user hovering over the icon, details can be displayed concerning the given feedback.

A user continues to provide feedback until all files 216 in the alias list have been processed. As a user provides this feedback, a suitcase icon (or other desired icon) can appear next to the alias, which indicates that a company tagging fix relevant to this alias has been generated. It is preferable that a user continue providing feedback on all the documents in the list, confirming High Confidence Tags 209, as well as correcting Precision and Recall Errors, because as a user works, the system continually processes this information and improves the adjustments and may automatically alter the initial fix type. An adjustment made before all documents in the list have been processed may have a negative effect on precision and recall.

Figure 2E:
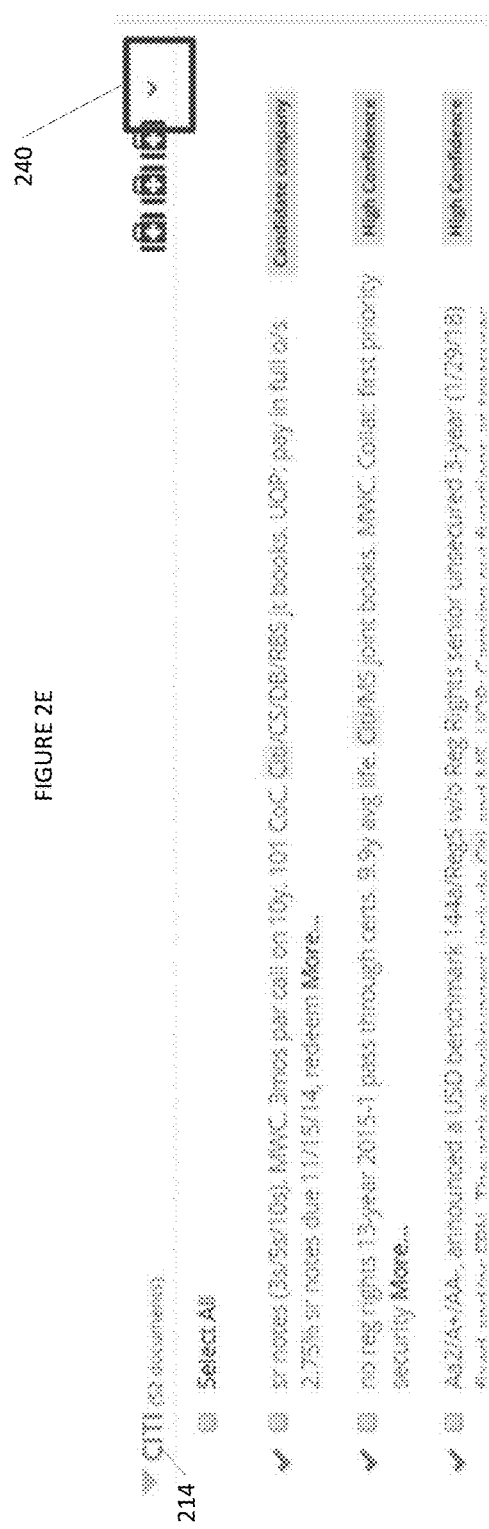

As one illustration, if a user's data includes mentions of the Nintendo® character Kirby®, and of the company Kirby, and both were identified and tagged as Kirby Corporation, if you correct only the Precision Errors, selecting NO for all the tagged mentions of Kirby, the character, a blacklist fix is generated (discussed below), which is incorrect. The blacklist fix tells the tagging mechanism that the phrase "Kirby" never refers to a company. However, if the user also confirms all the correctly applied tags, selecting YES for all the correctly tagged mentions of Kirby, the company, a contextual blacklist fix is generated. This is a contextual fix, which tells the tagging mechanism not to tag the phrase "Kirby" in a certain context. A user can select (click on) the arrow 240 to the right of the "suitcase" icon to see the type of company tagging fix that was generated, as illustrated in FIG. 2E. If the adjustment/fix is a contextual fix type, discussed in detail below with reference to FIG. 2G, it is helpful to select one or more suggested terms to help set the context.

If no adjustments result from the review of the tagging results, a user can upload additional documents that include a phrase that is incorrectly tagged. The user can then run a further tagging operation, and provide feedback on the new documents. A user can then repeat this procedure for all of the company aliases which were not tagged correctly. After this feedback cycle is complete, a user can then proceed to the Test screen.

Figure 2F:
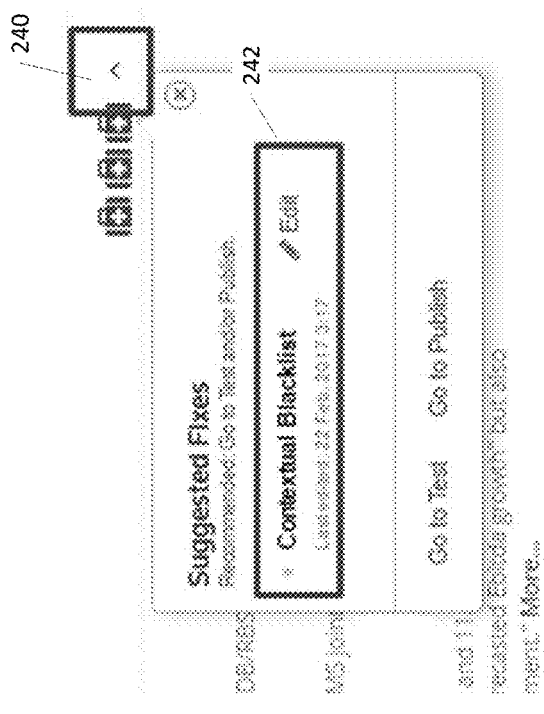
Figure 2G:
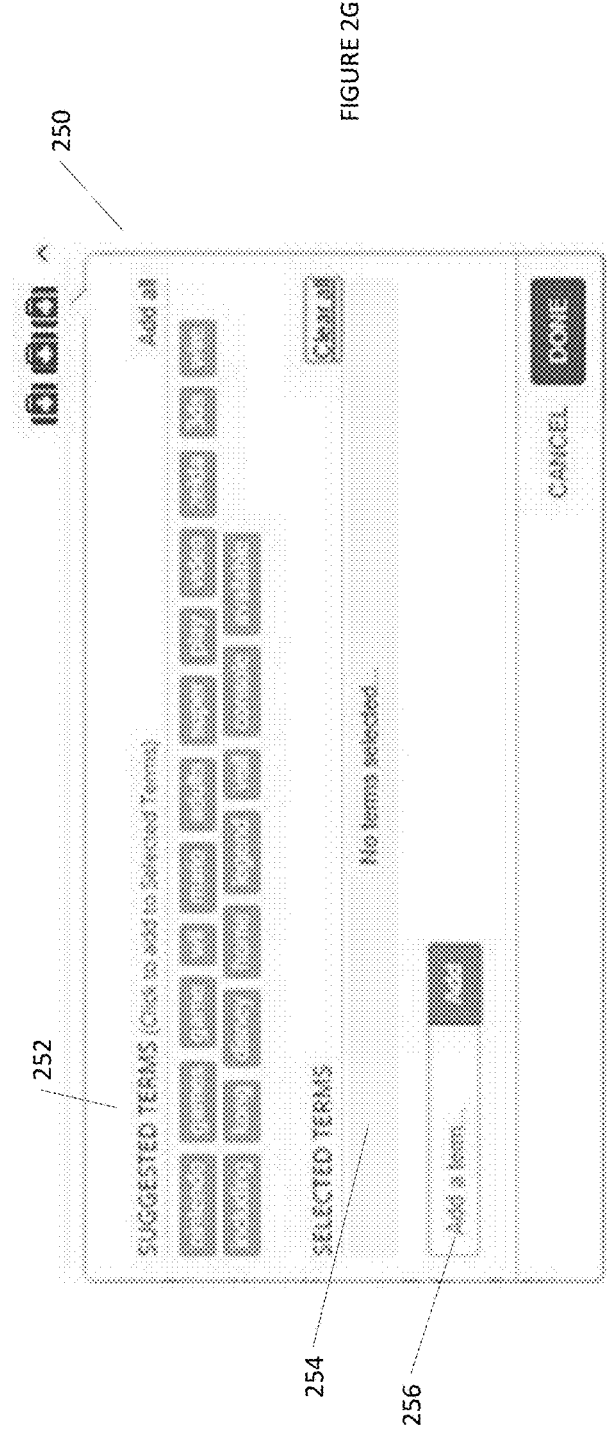

With continuing reference to FIG. 2F, the disclosed system can provide a variety of fix types. For example, the system can provide a "whitelist" adjustment, or fix, that corrects a recall issue. After making the adjustment, the tagging mechanism/engine will come to identify the whitelisted phrase as an alias of the company. A "blacklist" fix can be provided as an option, which corrects a precision issue. Once a potential alias is blacklisted, the tagging engine will no longer apply a company tag to this phrase. The system can further provide an option for a contextual whitelist adjustment, which similarly corrects a recall issue. Once implemented, a contextual whitelist adjustment causes the tagging engine to consider the specified phrase (the company alias) in context, that is, the engine seeks for another keyword that, when found in combination with the alias, causes the alias to be associated with the desired company (or other entity). Thus, the tagging engine will thereafter assign the company tag to the document if a whitelist term (a term in the Selected Terms list 254 created for this fix as illustrated in FIG. 2G) also appears in the document. The system can suggest terms 252 for the whitelisting that may be selected by the user as illustrated in FIG. 2G to facilitate the preparation of the contextual whitelisting adjustment. A user can select to edit to build the list of selected terms list for a contextual whitelist fix. Each contextual whitelist fix has its own selected terms list.

Conversely, the system can further provide a contextual blacklist adjustment 242 as illustrated in FIG. 2F, which also corrects a precision issue. The tagging mechanism considers the specified phrase (the company alias) in context, and will not assign the company tag if a blacklist term (a term in the Selected Terms list created for this fix via the GUI in FIG. 2G) also appears in the document. As with the contextual white list, each contextual blacklist fix has its own selected terms list.

The system can further provide a Resolution Override adjustment, which corrects a mapping issue when implemented. The tagging engine will still tag this phrase, but will map it to a different company (PermID) in the Thomson Reuters data set, as requested by the user.

As illustrated in FIG. 2G, every contextual fix has a corresponding Selected Terms list 254 that includes at least one term. The term(s) define the context of the fix. Thus, a whitelist term should be a clear indicator of a document that is about the company, whereas a blacklist term should be a clear indicator of a document that is not about the company.

For example, if the phrase "Kirby" refers sometimes but not always to the Kirby Corporation (and sometimes to the Nintendo® character, Kirby®), and a contextual blacklist fix is created in response to a user's feedback, a user might add the term "Nintendo" to the Contextual Blacklist Selected Terms list. If a document in which "Kirby" appears also contains the phrase "Nintendo," then in that context, "Kirby" is not identified as a mention of Kirby Corporation, nor is a tag assigned. As another example, the word "giraffe" might be an obvious indicator that a document containing the phrase "savannah" does not discuss the company "Savannah Petroleum." A user can add a Selected Term by hovering over and clicking on a suggested term, or by manually entering a term into the data entry field 256 of the GUI 250 in FIG. 2G. A user can also use the Add function to add whitelist terms to the list. A relevant term for a contextual whitelist is one that is likely to appear in a document in which the phrase is a company mention and not likely to appear in a document in which the same phrase is not a company mention. When the alias is found in a document that also includes a term from the list, the tagging engine identifies the phrase as a company mention and tags it.

For Contextual Blacklist Selected Terms, a user can select a relevant term in the Suggested Terms list 252 to add it to the Selected Terms list 254. A user can also use the Add function to add blacklist terms to the list through field 256. A relevant term for a contextual blacklist is thus one that is likely to appear in a document in which the phrase is not a company mention, and not likely to appear in a document in which the same phrase is a company mention. When a blacklist term appears in the document, the company tag will not be assigned.

Figure 2H:
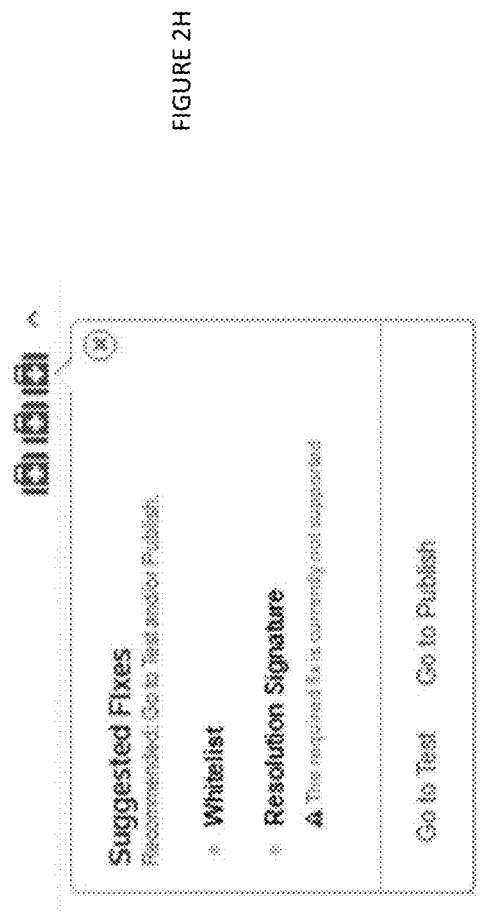
Figure 21:
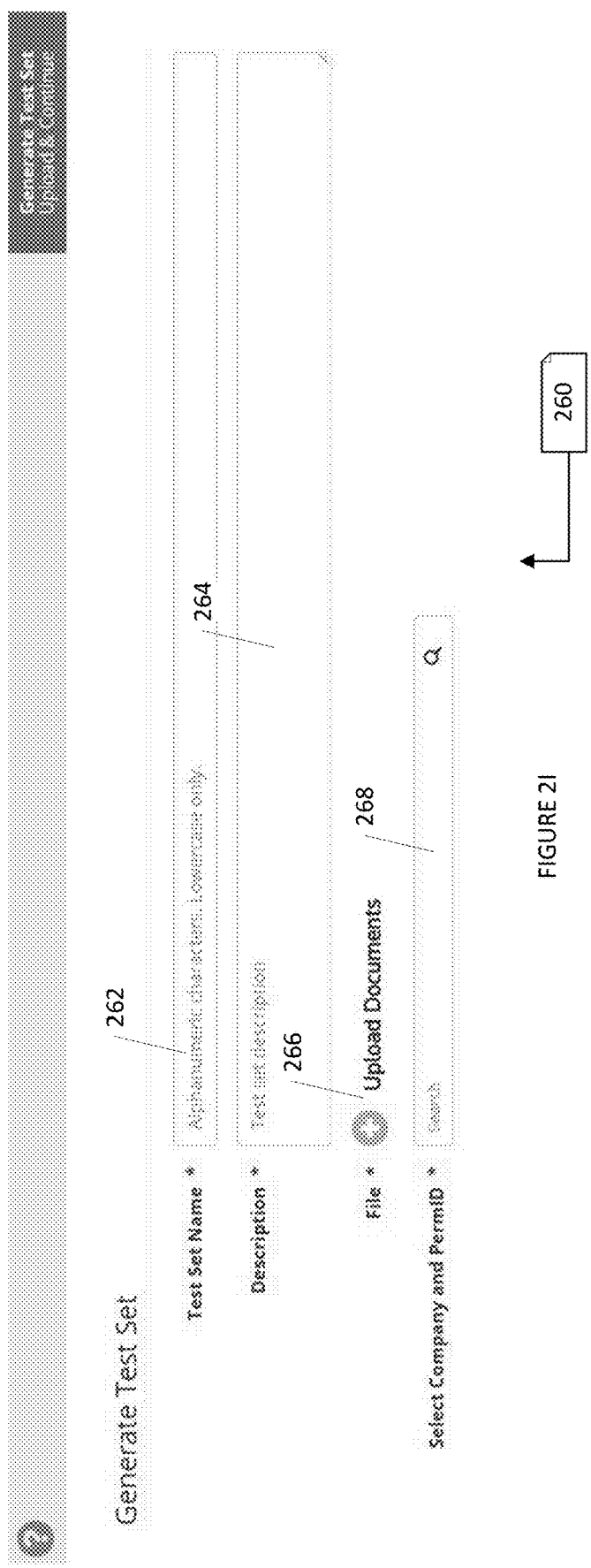

If desired, a Resolution Signature adjustment (FIG. 2H) can be provided to correct a mapping issue. This is relevant when a single phrase (alias) can refer to more than one company. The tagging mechanism will consider this phrase (alias) in context, and determine the company resolution based on the context in which the phrase is found. That is to say, the alias can be assigned to more than one company, depending upon the context in which it is used.

The test screens (FIGS. 2I-2Q) provide the tools to create and run a test that measures the quality of tagging for a specific company (or other entity), and to analyze the test results. At the beginning of a project, a user can use the test function to perform a baseline test, and then as a user performs entity tuning, to measure the effect of generated fixes on the quality of tagging.

To build a test set, a user can use the Corpus Builder to gather a set of files containing company mentions, and then use the test set generator interface 260 to upload and label these files. These should be files that have not been previously tagged by the tagging engine. When the test is run, the test set is tagged using all the company tagging fixes generated by work during tuning.

The user can name the test in the naming field 262, and if desired, enter a test description in field 264. The file field 266 can be used to select and upload the test set (e.g., via a ZIP file) that the user prepared with the corpus builder. The user can further select the company and unique identified (e.g., PermID) at field 268. This can be done in some implementations by entering the company name in field 268 and then pressing Enter. The system then generates and displays a list of suggested companies and/or unique identifiers (e.g., PermIDs), and the user can select the desired company.

Figure 2J:
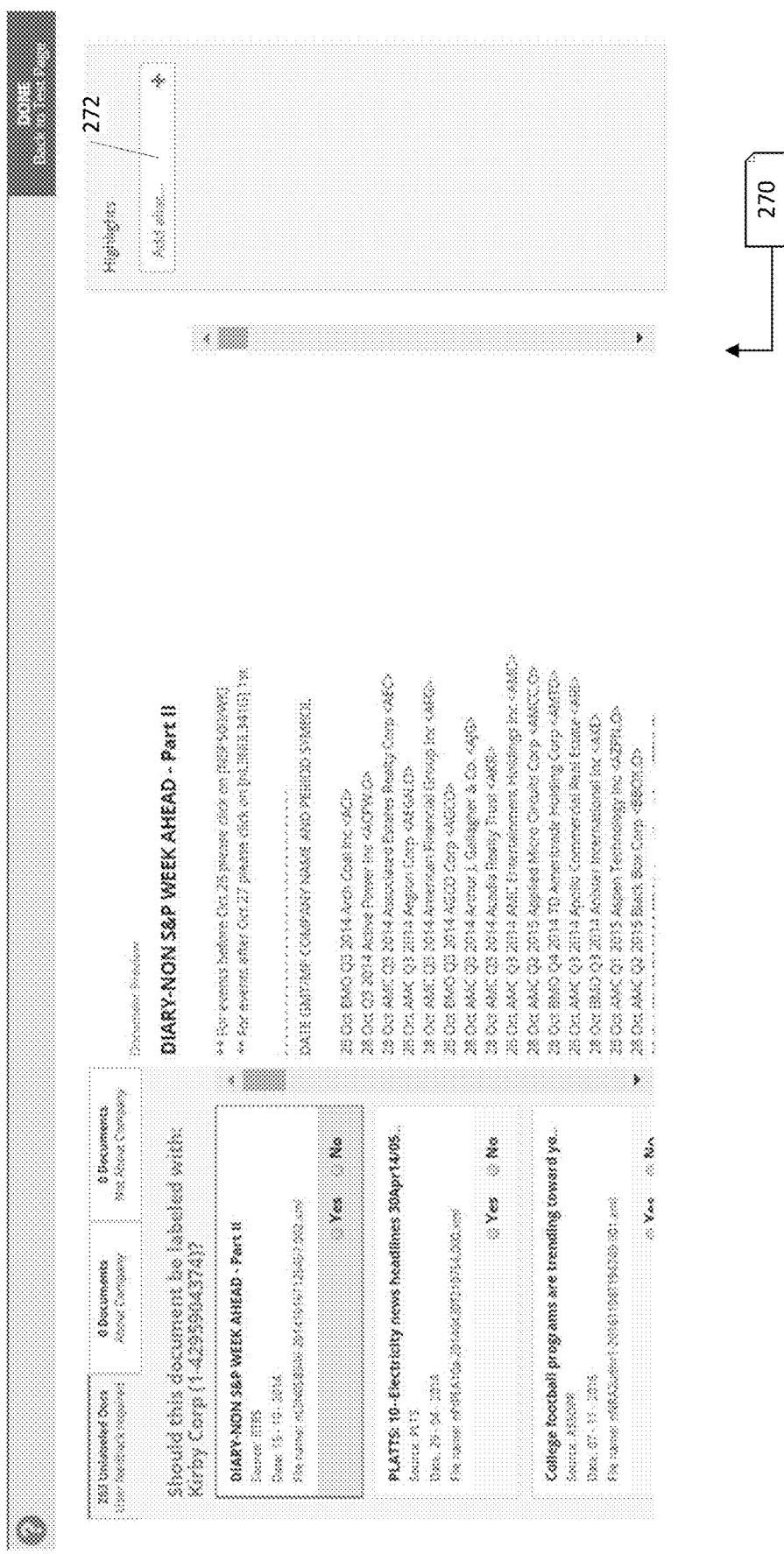
Figure 2K:
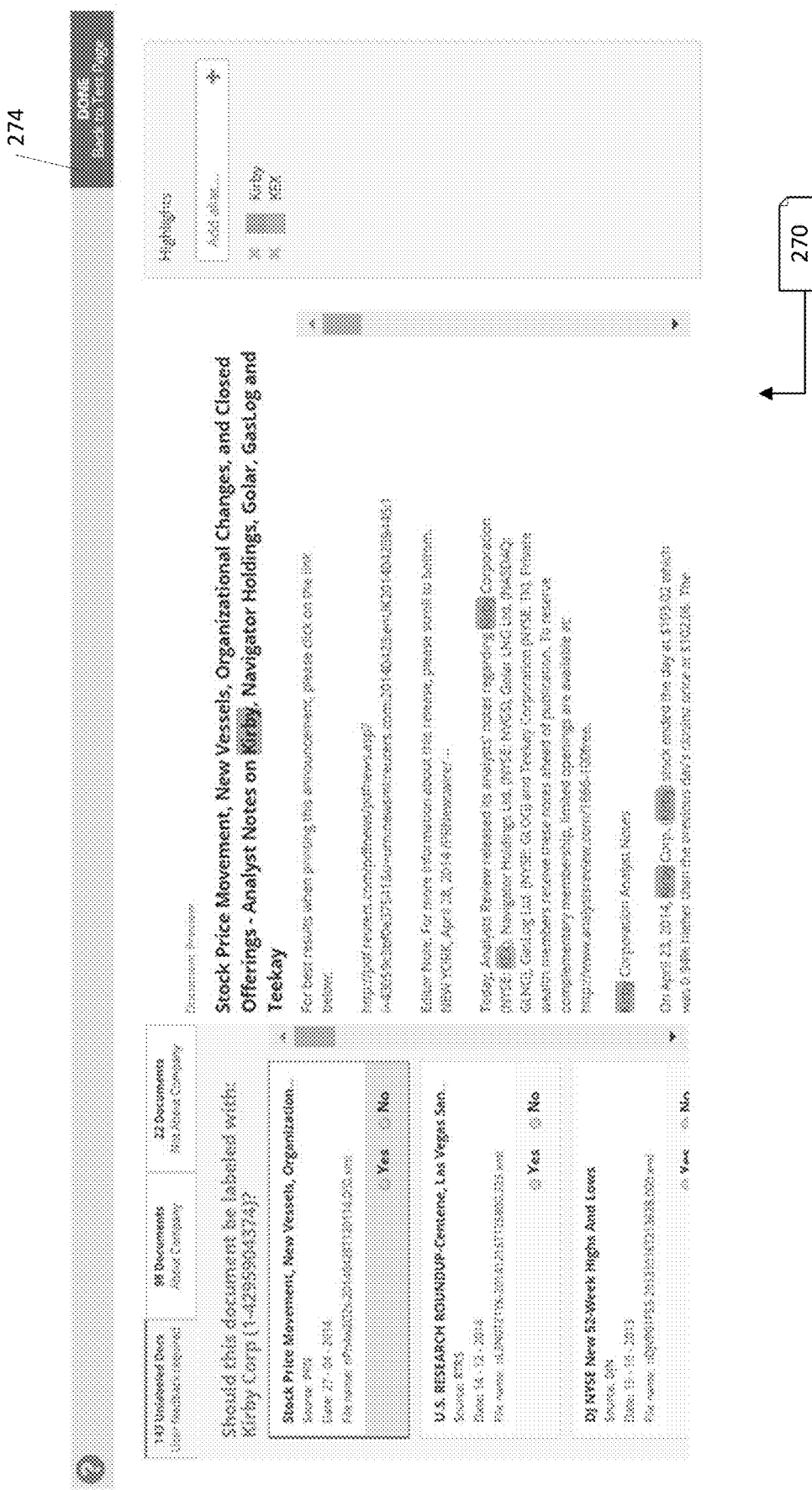

The user can then select to generate the test set, and the files are uploaded and displayed in the results screen 270, illustrated in FIG. 2J. Once the Precision and Recall values meet a user's requirements, the user is ready to publish, described in further detail below. Prior to publication, the user can continue to tune company tagging iteratively, uploading additional documents, tagging, and tuning as needed until the test results are acceptable.

As illustrated in FIG. 2J, a user can go through the list of documents and select Yes if the document mentions the company or No if it does not. To find and highlight instances of a company alias in the displayed files, a user can enter the phrase in the Highlights field and then click +. A user can create multiple highlights. When the user is finished labeling all the test set documents, they can proceed by clicking the "Done" actuator 274.

Figure 2L:
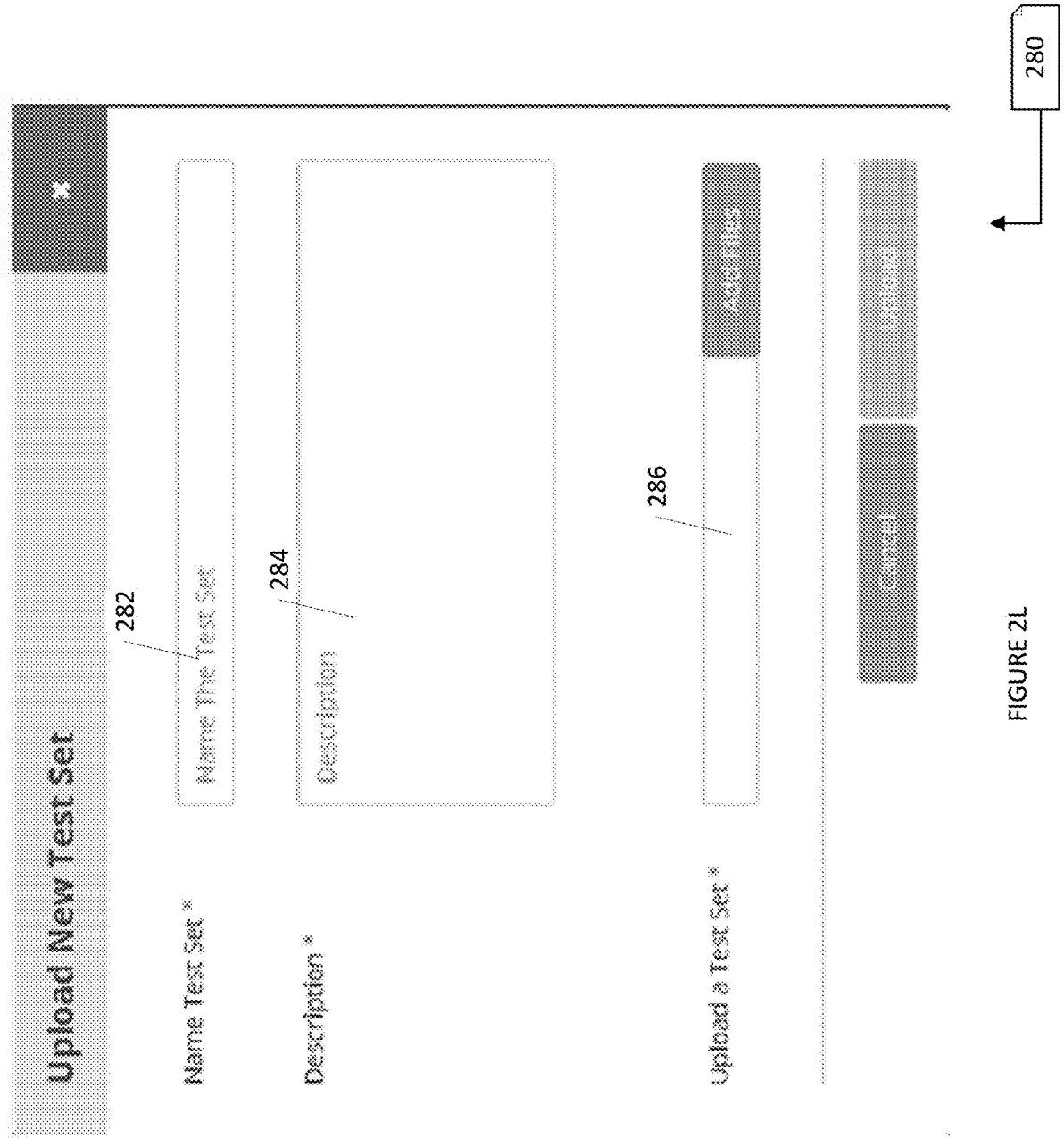

As illustrated in FIG. 2L, a user can the upload function to upload a test set constructed and labeled offline via the interface 280. In some implementations, the test set can use documents in XML format, a CSV file that lists and labels the XML files, both being incorporated into a ZIP file. To upload the test set, the ZIP file can be selected via field 286. The user can enter a name and description via fields 284 and 286, respectively.

After uploading, the test set appears in the list on the interface 290 depicted in FIG. 2M. As illustrated, the "# Documents" value 291 indicates the number of XML files in the uploaded zip file, each XML file including a document. The "# Labeled" value 292 indicates the number of manually tagged (in the CSV file) documents. The "# Companies in Set" value 293 indicates the number of labeled positive documents in the test set.

To run the test, the user launches the test function to tag the files in the test set by selecting "Run Test" 294. The Precision value 295 and Recall value 296 illustrated in the resulting UI displayed in FIG. 2N indicate the quality of company tagging using all the available company tagging fixes. Before an adjustment is generated via user intervention, a single set of Precision and Recall values (e.g., in percentage format) is displayed, as illustrated in FIG. 2N.

Once an adjustment is generated, two sets of Precision and Recall values are displayed, as illustrated in FIG. 2O. One set, 295, 296 indicates the quality of company tagging using all the available company tagging fixes, followed by another set of values (295a, 296a), in parentheses. The values in parentheses are the pre-fix Precision and Recall values. Recall 296 is a measure that indicates the percentage of company mentions in the test set that were identified and tagged using the available company tagging fixes. The value in parentheses is the default (pre-fix) recall measure. The Actions field 297 can be selected to edit the test set labels. View Results 298 can be selected to review and/or "drill down" on the test results.

Figure 2Q:

The view results interface 298a that results from selecting field 298 is illustrated in FIG. 2Q. This interface permits a user to drill down on test results to analyze the precision and recall issues, and to gain insight about how to continue tuning entity tagging. As illustrated, the view results interface 298a indicates the Precision and Recall results, and provides a listing of documents 298b. The document list 298b in turn includes the test set documents which were labeled positive, plus any negative documents which were tagged erroneously. Selecting a document in the listing can cause an extract of the document to appear in a document preview pane 298c. The number of documents in the list is indicated by the number to the left of the Precision and Recall results. Per document, a variety of details can be displayed, such as the company label and unique identifier (e.g., PermID). The PermID can be selected to open the relevant organization's page in PermID.org. Tagging results are also presented. These include pre-adjustment results, which remain the same throughout the project cycle (unless the user edit the test set labels). The tagging results also include post-adjustment results that utilize all available adjustments. However, these values may change throughout the project cycle. Changes indicate the effect of generated fixes on tagging results. Of these, possible values include "correct" (a labeled positive document that was tagged correctly), "incorrect" (indicates a precision issue, in that a labeled negative document was tagged by mistake), "recall" (indicates a recall issue, wherein a labeled positive document was not identified and tagged by the tagging mechanism), or "none" (indicates that no tag was assigned). In some implementations, "none" in the pre-adjustment results column can be paired with "incorrect" in the post-adjustment "results" column, and vice versa. "None" in the pre-adjustment "results" column indicates that an adjustment introduced a precision error. "None" in the post-adjustment "results" column indicates a corrected precision error.

Figure 2R:
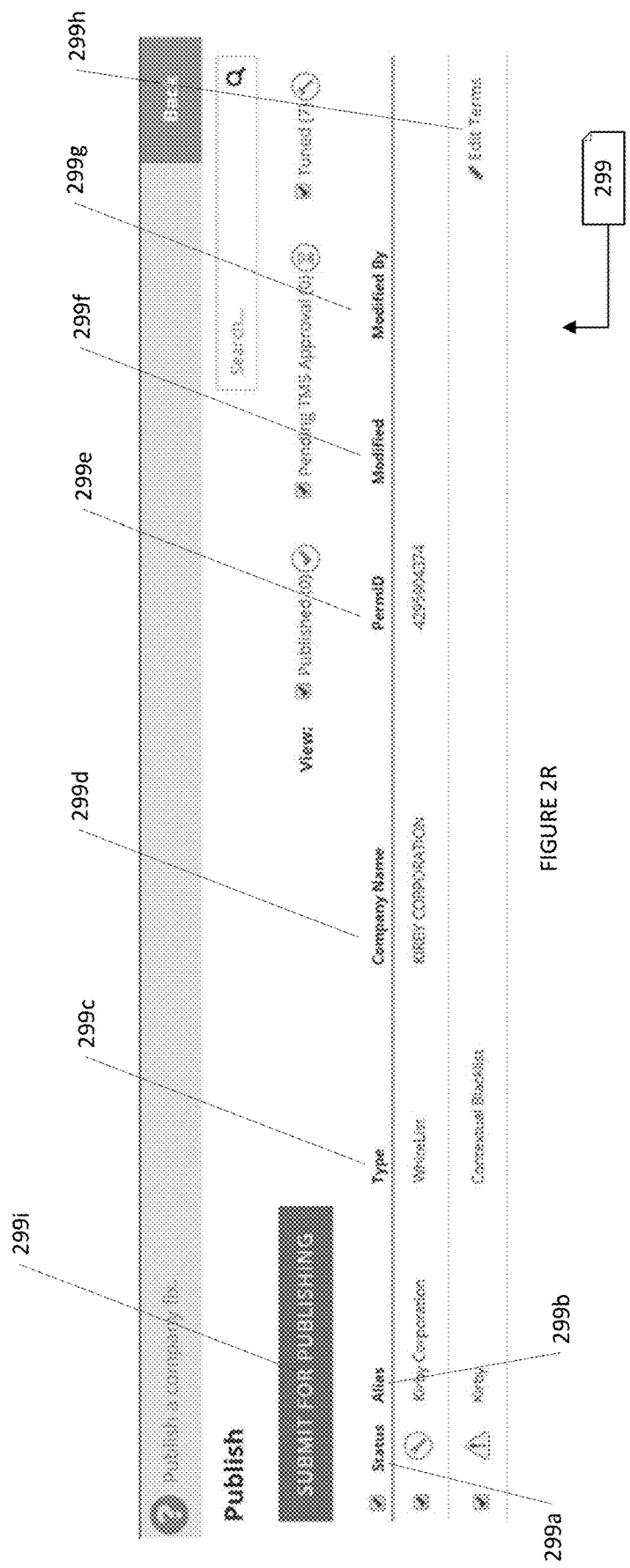

FIG. 2R illustrates an example of a publish screen 299. A user can use this screen to view the status of their company tagging adjustments and to submit them for publishing. The Publish screen 299 displays a list of company aliases and the available adjustment type. Status 299a indicates the status of the company tagging fix—whether it is tuned, Pending TMS Approval, or Published. A contextual fix as described herein requires at least one term definition. If a warning triangle appears in the Status column 299a, a user can click the Edit Terms link 299h (on the right) and create the selected terms list. Alias 299b indicates the particular company alias that was tuned. Type 299c references the type of company tagging fix that was created. Company Name 299d indicates the alias was mapped to this company in the data set. PermID 299e indicates the PermID of the company that the alias represents. Modified 299f lists the date the company alias was last tuned. "Modified By" 299g indicates the person, if any, who last tuned tagging for the particular company alias.

To publish a company tagging fix, a user can select one or more company aliases, and click submit 299i for publishing. This command packages the company tagging adjustments and sends them to TMS for approval. TMS will review and then deploy the company tagging fix to a production environment.

In further accordance with the disclosure, FIG. 3 presents an example of a logic/data flow diagram that illustrates a particular implementation of a method and system in accordance with the present disclosure. While logical elements and steps are presented, it will be appreciated that each actually corresponds to an appropriately programmed circuit module that is configured to execute the logic and move data from one component to another, as instructed by machine readable code that is being executed. The logical steps are separated that take place within or with respect to a machine of a user (client device), an analytics platform (server) and a graph database, wherein the devices are delimited from each other by dashed lines. Data flows from one device to another are represented by arrows crossing the dashed lines.

Figure 3A:
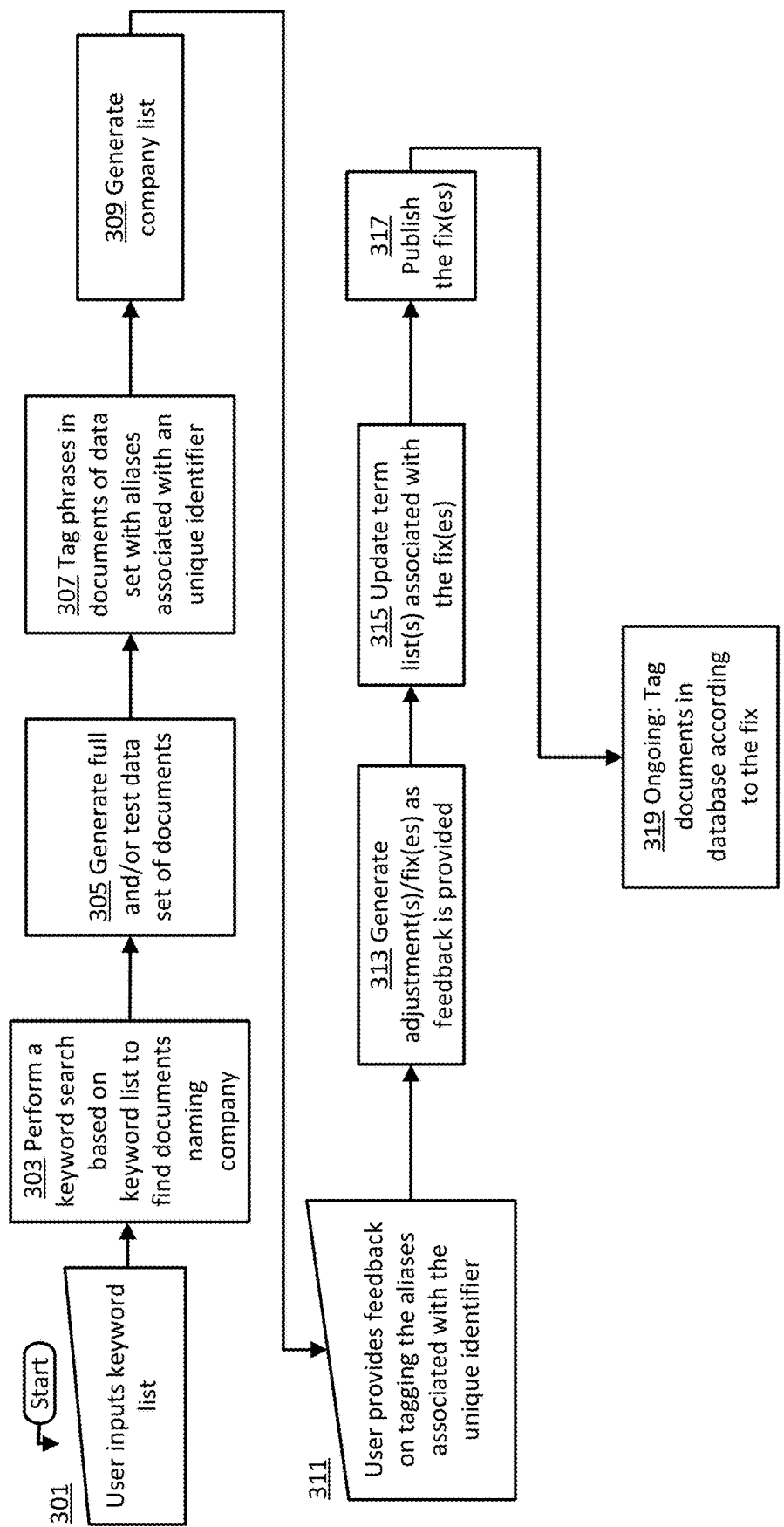
FIGS. 3A-3B show a logic and data flow diagrams, respectively, illustrating aspects of the system in one embodiment of the present disclosure.
Figure 3B:
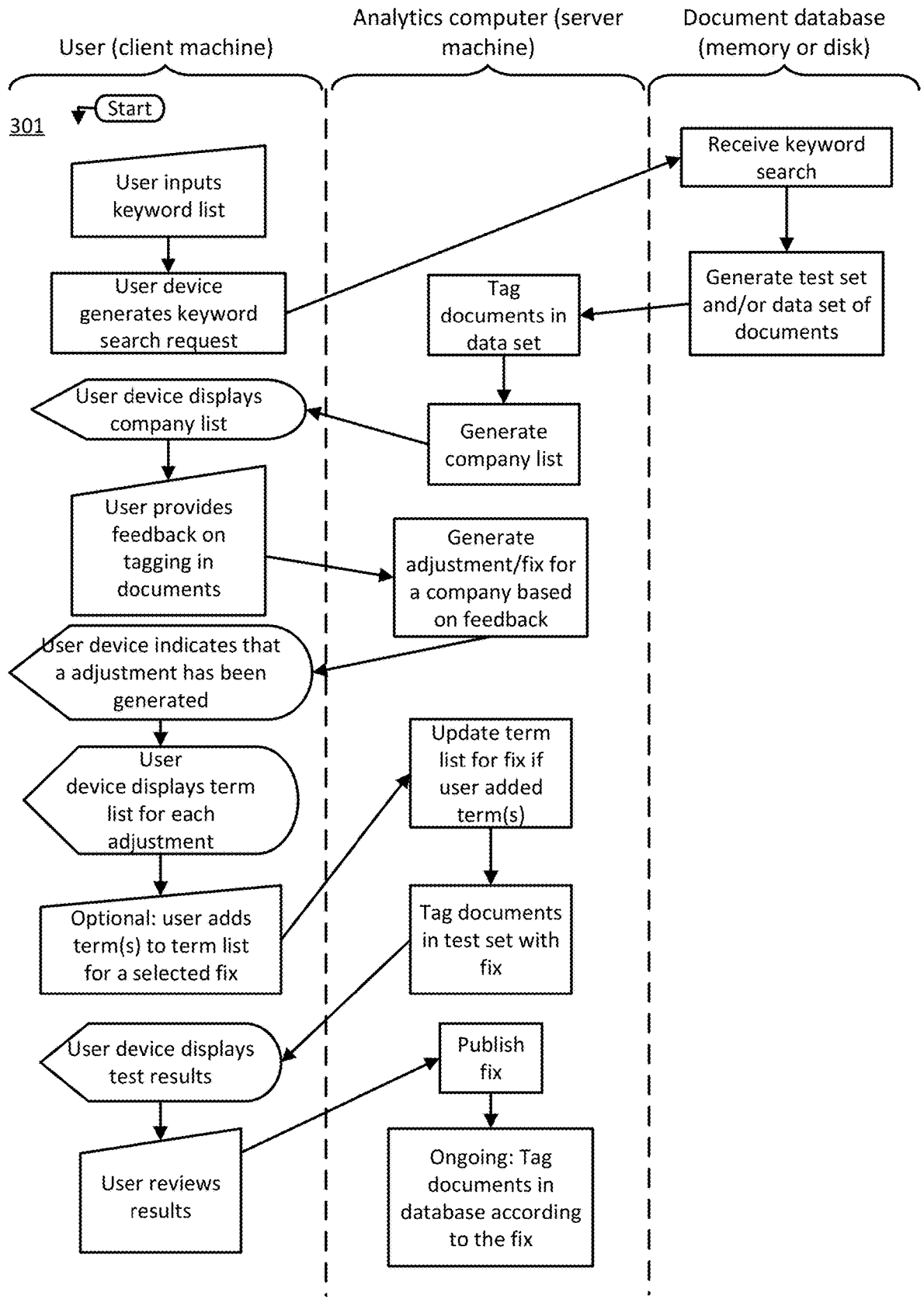

As illustrated in FIGS. 3A and 3B, an illustrative example begins at step 301 with a user, (e.g., 102), inputting a keyword list in support of a search. At step 303, the user directs a keyword search in a database for documents including the keywords, with the objective of locating documents relating to a particular entity, such as a company with a unique ID. In step 305, a data set of a corpus of documents and/or a subset of documents for testing is generated. At step 307, a tagging engine (e.g., the TRIT™ engine) is used to tag phrases in document of the data set of interest with aliases associated with a unique identifier (e.g., the ThomsonReuters PermID). A company list (e.g., 200) is then generated at step 309.

The user then provides feedback on tagging the aliases associated with the unique identifier at step 311. In association with receiving the feedback, the system continuously generates adjustments to the tagging at step 313. At 315, term lists can be updated with the adjustment(s). Once the user is satisfied with the results, the user can publish the fixes at step 317. The system continues to tag documents in accordance with the fixes at step 319. FIG. 3B illustrates the flow of data from a user to a server and a database of the illustrative method.

Detailed Description of the Coordinator

Figure 4:
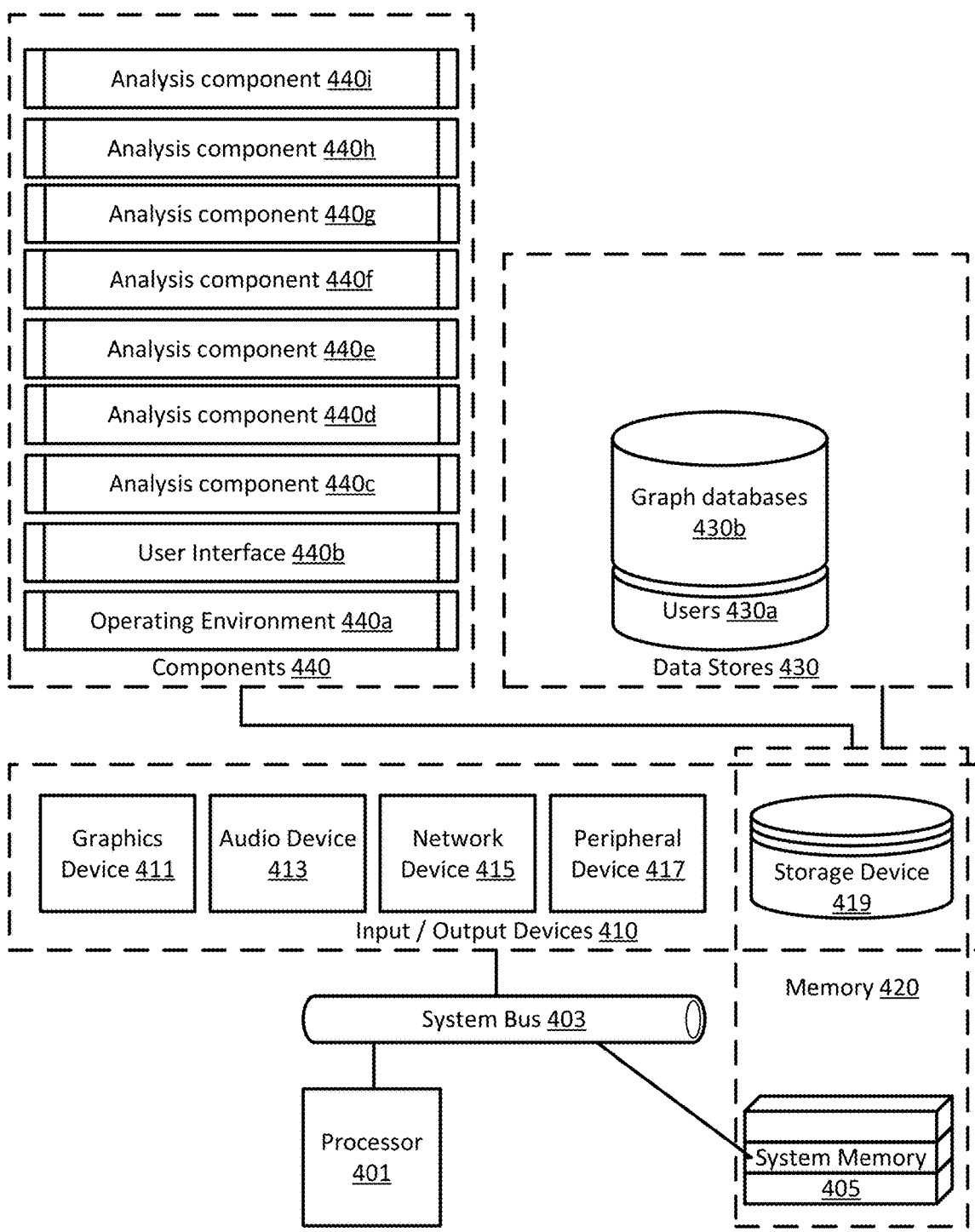
FIG. 4 shows a block diagram illustrating an exemplary system coordinator in one embodiment of the disclosure.

FIG. 4 shows a block diagram illustrating an exemplary coordinator in one embodiment of the disclosed embodiments. The coordinator facilitates the operation of the disclosed embodiments via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the coordinator may comprise a standalone computer system, a distributed computer system, a node in a computer network (i.e., a network of computer systems organized in a topology), a network of coordinators, and/or the like. It is to be understood that the coordinator and/or the various coordinator elements (e.g., processor, system bus, memory, input/output devices) may be organized in any number of ways (i.e., using any number and configuration of computer systems, computer networks, nodes, coordinator elements, and/or the like) to facilitate operation. Furthermore, it is to be understood that the various coordinator computer systems, coordinator computer networks, coordinator nodes, coordinator elements, and/or the like may communicate among each other in any number of ways to facilitate operation. As used in this disclosure, the term "user" refers generally to people and/or computer systems that interact with the; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; outside of the context of a graph database the term "node" refers generally to a server, to a client, and/or to an intermediary computer system, program, and/or a combination thereof that facilitates transmission of and/or handling of requests and/or responses.

The coordinator includes a processor 401 that executes program instructions. In various embodiments, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory 405 via a system bus 403. The system bus may interconnect these and/or other elements of the coordinator via electrical, electronic, optical, wireless, and/or the like communication links (e.g., the system bus may be integrated into a motherboard that interconnects coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's HyperTransport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions executed by the processor. The system memory may facilitate accessing, storing, retrieving, modifying, deleting, and/or the like data by the processor. In various embodiments, input/output devices 410 may be connected to the processor and/or to the system memory, and/or to one another via the system bus.

In some embodiments, the input/output devices may include one or more graphics devices 411. The processor may make use of the one or more graphic devices in accordance with program instructions executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data. A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be an ATI All-in-Wonder HD, a Hauppauge ImpactVBR 01381, a Hauppauge WinTV-HVR-2250, a Hauppauge Colossus 01414, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 413. The processor may make use of the one or more audio devices in accordance with program instructions executed by the processor. In one implementation, an audio device may be a sound card that may obtain (e.g., via a connected microphone), process, output (e.g., via connected speakers), and/or the like audio data. A sound card may be connected to the system bus via an interface such as PCI, PCI Express, USB, PC Card, ExpressCard, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster X-Fi Titanium HD, a Creative Sound Blaster X-Fi Go! Pro, a Creative Sound Blaster Recon 3D, a Turtle Beach Riviera, a Turtle Beach Amigo II, and/or the like. An audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 415. The processor may make use of the one or more network devices in accordance with program instructions executed by the processor. In one implementation, a network device may be a network card that may obtain (e.g., via a Category 5 Ethernet cable), process, output (e.g., via a wireless antenna), and/or the like network data. A network card may be connected to the system bus via an interface such as PCI, PCI Express, USB, FireWire, PC Card, ExpressCard, and/or the like. A network card may be a wired network card (e.g., 10/100/1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX-MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 417. The processor may make use of the one or more peripheral devices in accordance with program instructions executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a chemical sensor, a magnetometer, a radar, a sonar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the coordinator with a variety of input, output and processing capabilities.

In some embodiments, the input/output devices may include one or more storage devices 419. The processor may access, read from, write to, store in, erase, modify, and/or the like a storage device in accordance with program instructions executed by the processor. A storage device may facilitate accessing, storing, retrieving, modifying, deleting, and/or the like data (e.g., graph database data as described elsewhere herein) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool. In yet another example, an SSD cache may be used with a HDD to improve speed.

Together and/or separately the system memory 405 and the one or more storage devices 419 may be referred to as memory 420 (i.e., physical memory).

Memory 420 contains processor-operable (e.g., accessible) data stores 430. Data stores 430 comprise data that may be used via the coordinator. Such data may be organized using one or more data formats such as one or more of a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, coordinator elements, and/or the like) to facilitate operation. For example, data stores may comprise data stores 430a-n implemented as one or more databases. A user data store 430a may be a collection of database tables that include fields such as UserID, UserName, UserPreferences, and/or the like. A graph database data store 430b may be a collection of graph databases.

System memory 420 contains processor-operable (e.g., executable) components 440. Components 440 comprise program components (including program instructions and any associated data stores) that are executed via the coordinator (i.e., via the processor) to transform inputs into outputs. It is to be understood that the various components and their subcomponents, capabilities, applications, and/or the like may be organized in any number of ways (i.e., using any number and configuration of components, subcomponents, capabilities, applications, coordinator elements, and/or the like) to facilitate operation. Furthermore, it is to be understood that the various components and their subcomponents, capabilities, applications, and/or the like may communicate among each other in any number of ways to facilitate operation. For example, the various components and their subcomponents, capabilities, applications, and/or the like may be combined, integrated, consolidated, split up, distributed, and/or the like in any number of ways to facilitate operation. In another example, a single or multiple instances of the various components and their subcomponents, capabilities, applications, and/or the like may be instantiated on each of a single coordinator node, across multiple coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), WebSocket Protocol, Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 440 may include an operating environment component 440*a*. The operating environment component may facilitate operation of the system via various subcomponents. In some implementations, the operating environment component may include an operating system subcomponent. The operating system subcomponent may provide an abstraction layer that facilitates the use of, communication among, common services for, interaction with, security of, and/or the like of various coordinator elements, components, data stores, and/or the like.

In some embodiments, the operating system subcomponent may facilitate execution of program instructions by the processor by providing process management capabilities. For example, the operating system subcomponent may facilitate the use of multiple processors, the execution of multiple processes, multitasking, and/or the like.

In some embodiments, the operating system subcomponent may facilitate the use of memory by the system. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the coordinator as a node in a computer network by providing support for one or more communications protocols. For example, the operating system subcomponent may include support for the internet protocol suite (i.e., Transmission Control Protocol/Internet Protocol (TCP/IP)) of network protocols such as TCP, IP, User Datagram Protocol (UDP), Mobile IP, and/or the like. In another example, the operating system subcomponent may include support for security protocols (e.g., Wired Equivalent Privacy (WEP), Wi-Fi Protected Access (WPA), WPA2) for wireless computer networks. In yet another example, the operating system subcomponent may include support for virtual private networks (VPNs).

In some embodiments, the operating system subcomponent may facilitate security of the coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the system by providing user interface elements that may be used by the system to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, GTK+, Qt, Yahoo! User Interface Library (YUI), and/or the like. In another implementation, such user interface elements may include sounds (e.g., event notification sounds stored in $MP_3$ file format), animations, vibrations, and/or the like that may be used to inform the user regarding occurrence of various events. For example, the operating system subcomponent may include a user interface such as Windows Aero, Mac OS X Aqua, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 7, Microsoft Windows 8, Apple Mac OS X, Apple iOS, Android, Symbian, Windows Phone 7, Windows Phone 8, Blackberry QNX, and/or the like.

In some implementations, the operating environment component may include a database subcomponent. The database subcomponent may facilitate capabilities such as storage, analysis, retrieval, access, modification, deletion, aggregation, generation, and/or the like of data (e.g., the use of data stores 1130). The database subcomponent may make use of database languages (e.g., Structured Query Language (SQL), XQuery), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, Apache Cassandra database, and/or the like.

In some implementations, the operating environment component may include an information handling subcomponent. The information handling subcomponent may provide the system with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some embodiments, the information handling subcomponent may facilitate the serving of information to users, system components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 430) via the database subcomponent.

In some embodiments, the information handling subcomponent may facilitate presentation of information obtained from users, system components, nodes in a computer network, web servers, and/or the like. For example, the information handling subcomponent may comprise a web browser such as Microsoft Internet Explorer, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate system message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, AOL's Open System for Communication in Realtime (OSCAR), Messaging Application Programming Interface (MAPI), Facebook API, a custom protocol, and/or the like to facilitate system message communications. The messaging subcomponent may facilitate message communications such as email, instant messaging, Voice over IP (VoIP), video conferencing, Short Message Service (SMS), web chat, in-app messaging (e.g., alerts, notifications), and/or the like. For example, the messaging subcomponent may comprise Microsoft Exchange Server, Microsoft Outlook, Sendmail, IBM Lotus Domino, Gmail, AOL Instant Messenger (AIM), Yahoo Messenger, ICQ, Trillian, Skype, Google Talk, Apple FaceTime, Apple iChat, Facebook Chat, and/or the like.

In some implementations, the operating environment component may include a security subcomponent that facilitates system security. In some embodiments, the security subcomponent may restrict access to the system, to one or more services provided by the system, to data associated with the system (e.g., stored in data stores 430), to communication messages associated with the system, and/or the like to authorized users. Access may be granted via a login screen, via an API that obtains authentication information, via an authentication token, and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, and/or the like may be used to control access. For example, the security subcomponent may facilitate digital rights management (DRM), network intrusion detection, firewall capabilities, and/or the like.

In some embodiments, the security subcomponent may use cryptographic techniques to secure information (e.g., by storing encrypted data), verify message authentication (e.g., via a digital signature), provide integrity checking (e.g., a checksum), and/or the like by facilitating encryption and/or decryption of data. Furthermore, steganographic techniques may be used instead of or in combination with cryptographic techniques. Cryptographic techniques used by the system may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Digital Signature Algorithm (DSA)), cryptographic hash functions (e.g., using algorithms such as Message-Digest 5 (MD5), Secure Hash Algorithm 2 (SHA-2)), and/or the like. For example, the security subcomponent may comprise a cryptographic system such as Pretty Good Privacy (PGP).

In some implementations, the operating environment component may include a virtualization subcomponent that facilitates system virtualization capabilities. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via memory virtualization, storage virtualization, data virtualization, network virtualization, and/or the like. For example, the virtualization subcomponent may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solaris 10, Oracle Solaris 11), Informatica Data Services, Wine, and/or the like.

In some embodiments, components 440 may include a user interface component 440b. The user interface component may facilitate user interaction with the system by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In order to address various issues and advance the art, the entirety of this application (including the Cover Page, Title, Headings, Field, Background, Summary, Brief Description of the Drawings, Detailed Description, Claims, Abstract, Figures, Appendices or otherwise) shows by way of illustration various embodiments in which the claimed innovations may be practiced. The advantages and features of the application are of a representative sample of embodiments only, and are not exhaustive or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural or topological modifications may be made without departing from the scope or spirit of the disclosure. As such, all examples or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical or topological structure of any combination of any program components (a component collection), other components or any present feature sets as described in the figures or throughout are not limited to a fixed operating order or arrangement, but rather, any disclosed order is exemplary and all equivalents, regardless of order, are contemplated by the disclosure. Furthermore, it is to be understood that such features are not limited to serial execution, but rather, any number of threads, processes, services, servers, or the like that may execute asynchronously, concurrently, in parallel, simultaneously, synchronously, or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, or the like thereof. As such, it should be understood that advantages, embodiments, examples, functional, features, logical, operational, organizational, structural, topological, or other aspects of the disclosure are not to be considered limitations on the disclosure as defined by the claims or limitations on equivalents to the claims.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Descriptions herein of circuitry and method steps and computer programs represent conceptual embodiments of illustrative circuitry and software embodying the principles of the disclosed embodiments. Thus the functions of the various elements shown and described herein may be provided through the use of dedicated hardware as well as hardware capable of executing software in association with appropriate software as set forth herein.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein.

Similarly, it will be appreciated that the system and process flows described herein represent various processes which may be substantially represented in computer-readable media and so executed by a computer or processor, whether or not such computer or processor is explicitly shown. Moreover, the various processes can be understood as representing not only processing and/or other functions but, alternatively, as blocks of program code that carry out such processing or functions.

The methods, systems, computer programs and mobile devices of the present disclosure, as described above and shown in the drawings, among other things, provide for improved data analysis methods, systems and machine readable programs for carrying out the same. It will be apparent to those skilled in the art that various modifications and variations can be made in the devices, methods, software programs and mobile devices of the present disclosure without departing from the spirit or scope of the disclosure. Thus, it is intended that the present disclosure include modifications and variations that are within the scope of the subject disclosure and equivalents.

What is claimed is:

1. A method of adjusting results generated by an automated tagging engine, comprising:
    receiving a request to upload at least one document from a user via processor;
    assigning a first metadata tag via processor to at least one word contained within the at least one document, wherein the first metadata tag identifies the at least one word as an alias for a first unique entity;
    delivering the at least one document to the user including said first metadata tag via processor;
    receiving feedback via processor from said user relating to the assignment of the first metadata tag to the at least one word;
    determining at least one potential adjustment for said assignment of said first metadata tag via processor;
    sending information to the user proposing said at least one potential adjustment via processor; and
    receiving confirmation information from said user concerning said potential adjustment via processor.

2. The method of claim 1, further comprising implementing said at least one potential adjustment by assigning a different metadata tag to said at least one word in said at least one document via processor.

3. The method of claim 1, wherein said assigning step precedes said first receiving step.

4. The method of claim 1, wherein said first receiving step precedes said assigning step.

5. The method of claim 1, wherein said at least one document includes a plurality of documents.

6. The method of claim 1, wherein said at least one word includes a plurality of words.

7. The method of claim 1, wherein said at least one word includes a phrase.

8. The method of claim 7, wherein said phrase is one of a plurality of aliases for said entity associated with said unique identifier.

9. The method of claim 1, wherein sending information to the user proposing said at least one potential adjustment via processor includes providing a plurality of potential adjustments to the user.

10. The method of claim 1, wherein said at least one potential adjustment includes not assigning a tag to said at least one word.

11. The method of claim 1, wherein said at least one potential adjustment includes assigning a tag to said at least one word that associates said at least one word with a second unique entity.

12. The method of claim 1, wherein said first unique entity is associated with a first unique identifier.

13. The method of claim 12, wherein said second unique entity is associated with a second unique identifier.

14. The method of claim 1, wherein said at least one document includes a data set including a plurality of documents, wherein said data set is generated by the user performing a keyword search of a database for documents including at least one of a plurality of aliases associated with the first unique entity based on a keyword list, said plurality of aliases including words (i) that are, and, (ii) that are not associated with the first unique entity.

15. The method of claim 14, wherein performing said keyword search includes receiving a list of keywords to be searched from the user.

16. The method of claim 1, wherein determining said at least one potential adjustment for said assignment of said first metadata tag includes generating a term list including a phrase that is one of the plurality of aliases for the first unique entity.

17. The method of claim 1, wherein determining said at least one potential adjustment for said assignment of said first metadata tag includes generating a term list including a phrase that is not one of the plurality of aliases for the first unique entity.

18. The method of claim 1, wherein determining said at least one potential adjustment for said assignment of said first metadata tag includes:
generating a term list relating to the first unique entity, and further wherein tagging at least one word of a further document includes (i) determining if said further document includes said at least one word, and (ii) determining if said further document also includes a term from said term list; and
tagging said at least one word in said further document if a term from said term list is present in said further document.

19. The method of claim 1, wherein determining said at least one potential adjustment for said assignment of said first metadata tag includes:
generating a term list relating to the first unique entity, and further wherein tagging at least one word of a further document includes (i) determining if said further document includes said at least one word, and (ii) determining if said further document also includes a term from said term list; and
not tagging said at least one word in said further document if a term from said term list is present in said further document.

20. An apparatus comprising a plurality of circuit modules, computer memory, and at least one processor configured and arranged to adjust results generated by an automated tagging engine, comprising:
a first circuit module configured and arranged to receive a request to upload at least one document from a user;
a second circuit module configured and arranged to assign a first metadata tag to at least one word contained within the at least one document, wherein the first metadata tag identifies the at least one word as an alias for a first unique entity;
a third circuit module configured and arranged to deliver the at least one document to the user including said first metadata tag;
a fourth circuit module configured and arranged to receive feedback from said user relating to the assignment of the first metadata tag to the at least one word;
a fifth circuit module configured and arranged to determine at least one potential adjustment for said assignment of said first metadata tag;
a sixth circuit module configured and arranged to send information to the user proposing said at least one potential adjustment; and
a seventh circuit module configured and arranged to receive confirmation information from said user concerning said potential adjustment.

21. A non-transitory computer readable medium storing a computer program to operate a system for adjusting results generated by an automated tagging engine, the program comprising:
instructions for receiving a request to upload at least one document from a user;
instructions for assigning a first metadata tag to at least one word contained within the at least one document, wherein the first metadata tag identifies the at least one word as an alias for a first unique entity;
instructions for delivering the at least one document to the user including said first metadata tag;
instructions for receiving feedback from said user relating to the assignment of the first metadata tag to the at least one word;
instructions for determining at least one potential adjustment for said assignment of said first metadata tag;
instructions for sending information to the user proposing said at least one potential adjustment; and
instructions for receiving confirmation information from said user concerning said potential adjustment.

* * * * *